United States Patent
Sakaguchi et al.

(10) Patent No.: US 6,448,951 B1
(45) Date of Patent: Sep. 10, 2002

(54) LIQUID CRYSTAL DISPLAY DEVICE

(75) Inventors: Yoshitami Sakaguchi, Zama; Fumiaki Yamada, Yokohama; Yoichi Taira, Tokyo-to, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/293,473

(22) Filed: Apr. 15, 1999

(30) Foreign Application Priority Data

May 11, 1998 (JP) .......................................... 10-127583

(51) Int. Cl.[7] ................................................ G09G 3/36
(52) U.S. Cl. ............................ 345/88; 345/87; 345/102
(58) Field of Search ............................ 345/87, 88, 55, 345/92, 98–102, 103; 348/761, 790, 792

(56) References Cited

U.S. PATENT DOCUMENTS

| | | | | |
|---|---|---|---|---|
| 4,978,952 A | * | 12/1990 | Irwin | 345/102 |
| 5,121,233 A | * | 6/1992 | Spencer et al. | 349/69 |
| 5,128,782 A | * | 7/1992 | Wood | 349/61 |
| 5,337,068 A | * | 8/1994 | Stewart et al. | 345/88 |
| 5,461,397 A | * | 10/1995 | Zhang et al. | 345/102 |
| 5,877,740 A | * | 3/1999 | Hirakata et al. | 345/103 |
| 6,111,560 A | * | 8/2000 | May | 345/102 |

FOREIGN PATENT DOCUMENTS

| | | |
|---|---|---|
| JP | 3-78790 | 4/1991 |
| JP | 9-61785 | 3/1997 |

\* cited by examiner

Primary Examiner—Richard Hjerpe
Assistant Examiner—Alexander Eisen
(74) Attorney, Agent, or Firm—Scully, Scott, Murphy & Presser; Marian Underweiser, Esq.

(57) ABSTRACT

A low cost LCD device employing a high speed field sequential drive scheme. The liquid crystal display device comprises: a liquid crystal display array divided into a first area, a second area and a third area, in each of which are included a plurality of pel lines; a first device for performing an operation for sequentially writing first color data, selected from data provided for red, green and blue, along the plurality of pel lines in the first area, an operation for sequentially writing second color data, selected from data provided for red, green and blue, along the plurality of pel lines in the second area, and an operation for sequentially writing third color data, selected from data provided for red, green and blue, along the plurality of pel lines in the third area; a backlight device, which is divided into N backlight sections, with N being a multiple of three (3) and is equal to or greater than (6), and which selectively generates red light, green light or blue light, wherewith N/3 backlight sections illuminate the first area, N/3 backlight sections illuminate the second area and N/3 backlight sections illuminate the third area; and a second device for sequentially activating the N/3 backlight sections for the second area to generate second color light and sequentially displaying the second color data in the second area, and for sequentially activating the N/3 backlight sections for the third area to generate third color light and sequentially displaying the third color data in the third area.

22 Claims, 24 Drawing Sheets

LIQUID CRYSTAL DISPLAY DEVICE

BACKGROUND OF THE INVENTION

1. Technical Field

The present invention relates to a liquid crystal display device that is driven in accordance with a field sequential drive scheme, and more specifically to a liquid crystal display device for which the high speed sequential drive scheme can be employed.

2. Prior Art

A field sequential drive scheme has been employed to display a color image on a liquid crystal display (LCD) device without using a color filter. According to the field sequential drive scheme, image data for one color are written to an LCD panel, and when a response time required for switching the state of liquid crystal molecules has elapsed, a backlight for that color is turned in to display the image data. This repetitious operation is performed for red (R), green (G) and blue (B) colors. In order to provide a satisfactorily extended turn-On period for a backlight, a high speed writing circuit (high speed driver) and a high speed liquid crystal material are required. When the LCD panel is driven at a frame frequency $F_f$ (Hz), the time available for displaying an image in one color is $\frac{1}{3} F_f$, and during this time, the writing of the image data to the LCD panel, the switching of the state of the liquid crystal material and the display of an image using the backlight must be completed. When, for example, the response time of the liquid crystal material is 3 ms, $F_f$=60 Hz and the duty ratio of the backlight is 10%, the period $T_{write}$(s) for writing data to the LCD panel is represented by the following equation:

$$T_{write} = \frac{1}{180} - \frac{3}{1000} - 0.1 \times \frac{1}{60} \text{ (s)} \approx 889 \quad (\mu s).$$

When an LCD panel using an XGA scheme (1024 picture elements (pels) (horizontally) ×768 pels (vertically) is employed, the time for writing one horizontal pel line is approximately 1 $\mu$s.

Such a high speed writing operation for one pel line can not be achieved by a currently available thin film transistor (TFT) that is made of an amorphous semiconductor and that has an operational speed of approximately 20 $\mu$s. To provide such a high speed writing operation requires the employment of a TFT made of polysilicon, a high speed liquid crystal material, and a high speed driver having an operational speed that is higher then that of currently available drivers. However, a TFT made of polysilicon, a high speed liquid crystal material, and a high speed driver would be very expensive.

It is, therefore, one subject of the present invention to provide a low cost LCD device for which a high speed field sequential drive scheme can be employed that uses a currently available low cost write driver, and a low cost liquid crystal material.

SUMMARY OF THE INVENTION

The present invention is thus directed to a liquid crystal display device comprising: a liquid crystal display array divided into a first area, a second area and a third area, in each of which are included a plurality of pel lines; a first means for performing an operation for sequentially writing first color data, selected from data provided for red, green and blue, along the plurality of pel lines in the first area, an operation for sequentially writing second color data, selected from the data provided for red, green and blue, along the plurality of pel lines in the second area, and an operation for sequentially writing third color data, selected from the data provided for red, green and blue, along the plurality of pel lines in the third area; a backlight means, which is divided into N backlight sections (N is a multiple of 3 and is equal to or greater than 6) and which selectively generates red light, green light or blue light, wherewith N/3 backlight sections illuminate the first area, N/3 backlight sections illuminate the second area and N/3 backlight sections illuminate the third area; and a second means for sequentially activating the N/3 backlight sections for the first area to generate first color light and sequentially displaying the first color data in the first area, for sequentially activating the N/3 backlight sections for the second area to generate second color light and sequentially displaying the second color data in the second area, and for sequentially activating the N/3 backlight sections for the third area to generate third color light and sequentially displaying the third color data in the third area.

The first means performs simultaneously the operation for writing the first color data, the operation for writing second color data and the operation for writing the third color data.

The first area, the second area and the third area are each divided into N/3 sub-areas, and in each of the sub-areas are included a plurality of pel lines.

When one color data set is written in one of the sub-areas, the second means activates a backlight section assigned for the sub-area, and before another color data set is written in the sub-area, the second means deactivates the backlight section.

The same number of pel lines are included in the first area, the second area and the third area.

When one part of one color data set is displayed in one of the sub-areas, the following part of the color data is written in the succeeding sub-area.

When one part of one color data set is displayed in one of the sub-areas, the following part of the color data is written across the pel lines in the succeeding multiple sub-areas.

A backlight section assigned for one of the sub-areas is turned on following the expiration of a response time for a liquid crystal material in the last pel line in the sub-area.

The first means writes the first color data, the second color data and the third color data at predetermined intervals in one of the sub-areas, and a backlight section assigned for the sub-area generates light for the first color when the first color data have been written, generates light for the second color when the second color data have been written, and generates light for the third color when the third color have been written.

The second means controls the N backlight sections so as to sequentially display the color data written in the sub-areas during a period $1/F_f$ ($F_f$ is a frame frequency).

According to another aspect of the present invention, a liquid crystal display device comprises: a liquid crystal display array, which includes horizontally arranged X pels and vertically arranged Y pels, which is divided into a first area, a second area and a third area, in each of which are included horizontally extended Y pel lines, and which is divided into N/3 sub-areas (N is a multiple of 3 and is equal to or greater than 6); a first means for performing an operation for sequentially writing first color data, selected from data provided for red, green and blue, across Y pel lines beginning with the first pel line in the first area, continuing through the pel lines in the second area and ending with the last pel line in the third area, for performing an operation for sequentially writing second color data, selected from the data provided for red, green and blue, across Y pel lines beginning with the first pel line in the second area, continuing through the pel lines in the third area and ending with the last pel line in the first area, and for performing an operation for sequentially writing third color data selected form the red, green ad blue data into Y pel lines beginning with the first pel line in the third area, continuing through the pel lines in the first area and ending with the last pel line in the second area; a backlight means, which is divided into N backlight sections and which selectively generates red light, green light or blue light, wherewith N/3 backlight sections illuminate the first area, N/3 backlight sections illuminate the second area and N/3 backlight sections illuminate the third area; and a second means for controlling the N backlight sections, so that when one color data set, selected from the data provided for red, green and blue, have been written to one of the sub-areas, a backlight section assigned for the sub-area is turned on to generate a light having the same color as the color data set.

According to an additional aspect of the present invention, a liquid crystal display device comprises: a liquid crystal display array in which are included a plurality of pel lines; a first means for sequentially writing across the plurality of pel lines first color data selected form data provided for red, green and blue, for sequentially writing across the plurality of pel lines second color data selected from the data provided for red, green and blue, and for sequentially writing to the plurality of pel lines third color data selected from the data provided for red, green and blue; a backlight means, which is divided into N backlight sections (N is an integer equal to or greater than 2) and which selectively generates red light, green light or blue light, whereof each of the N backlight sections is assigned for a 1/N area in the liquid crystal display array; and a second means for sequentially activating the N backlight sections in order to sequentially display the color data written across the plurality of pel lines in the liquid crystal display array.

When one color data set has been written across pel lines in the 1/N area, the second means activates a backlight section assigned for the 1/N area to generate a light having the same color as the color data set, and then, before another color data set is written to the 1/N area, the second means deactivates the backlight section.

According to a further aspect of the present invention, a liquid crystal display device comprises: a liquid crystal display array, each of which includes a plurality of pel lines that are sorted into a plurality of pel line groups, each of which includes at least two continuous pel lines; a first means for sequentially writing to the plurality of pel line groups first color data selected from data provided for red, green and blue, for sequentially writing to the plurality of pel line groups second color data selected from the data provided for red, green and blue, and for sequentially writing to the plurality of pel line groups third color data selected from the data provided for red, green and blue; a backlight means, which is divided into N backlight sections (N is an integer equal to or greater than 2) and which selectively generates red light, green light or blue light, whereof each of the N backlight sections is assigned for a 1/N are in the liquid crystal display array; and a second means for sequentially activating the N backlight sections in order to sequentially display the color data written across the plurality of pel line groups in the liquid crystal display array.

BRIEF DESCRIPTION OF THE DRAWINGS

Preferred embodiments of the present invention will now be described, by way of example only, with reference to the accompanying drawings in which:

FIG. 7 is a diagram showing the processing for writing R, G and B image data in the areas 3A, 3B and 3C of the TFT LCD array.

FIG. 8 is a diagram showing the processing for writing R, G and B image data in the areas 3A, 3B and 3C of the TFT LCD array, and the control provided for the backlight sections.

FIG. 9 is a diagram showing the processing for writing R, G and B image data in the areas 3A, 3B and 3C of the TFT LCD array, and the control provided for the backlight sections.

FIG. 10 is a diagram showing the processing for writing R, G and B image data in the areas 3A, 3B and 3C of the TFT LCD array, and the control provided for the backlight sections.

FIG. 18 is a diagram showing the processing in the time division scheme for writing R, G and B image data in the display areas of the TFT LCD array.

FIG. 19 is a diagram showing the processing for writing R, G and B image data in the display areas of the TFT LDC array, and the control provided for the backlight sections.

FIG. 20 is a diagram showing the processing for writing R, G and B image data in the display areas of the TFT LCD array, and the control provided for the backlight sections.

DETAILED DESCRIPTION OF THE PREFERRED EMBODIMENTS OF THE INVENTION

Figure 1:
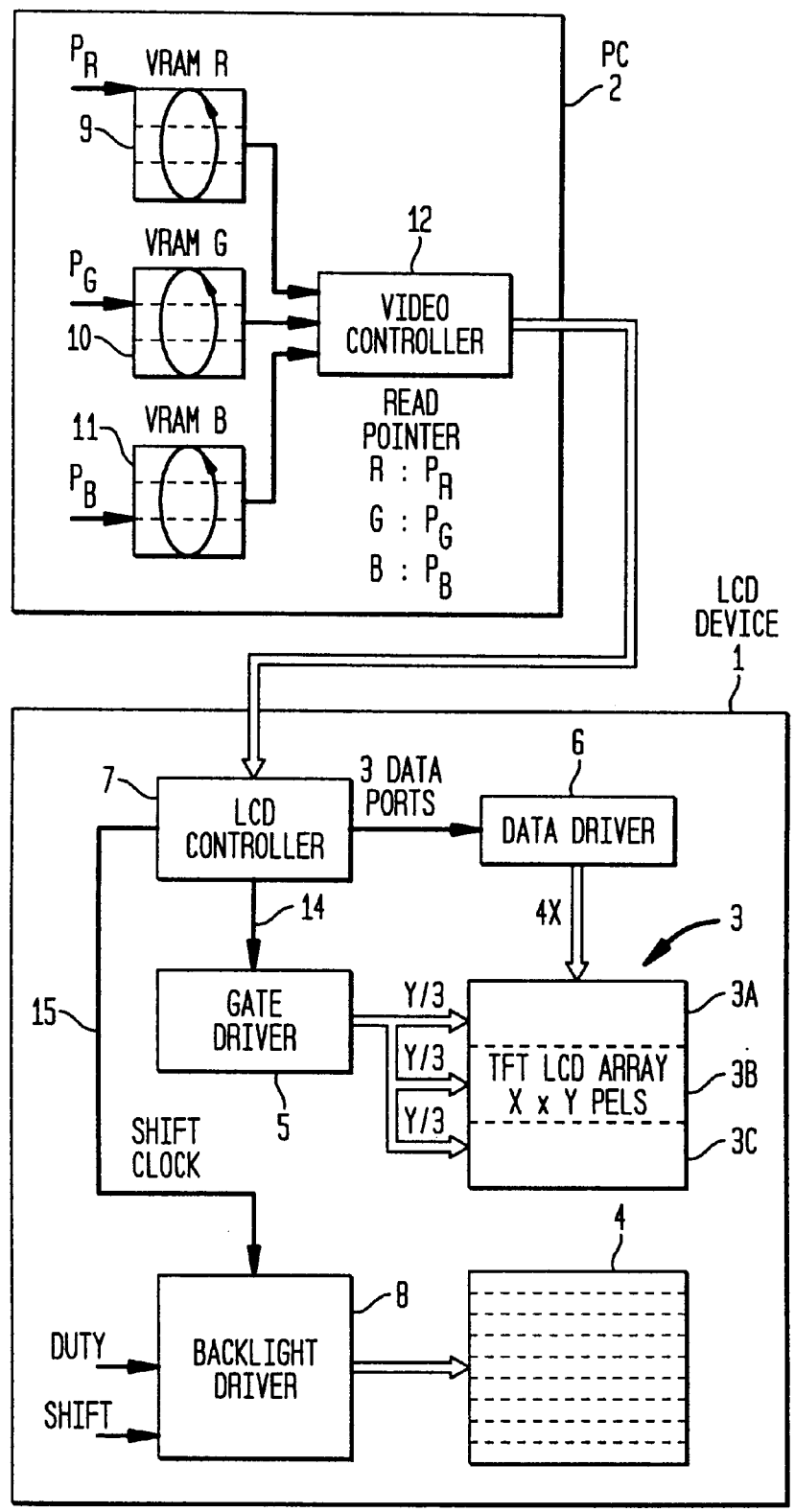
FIG. 1 is a block diagram illustrating a liquid crystal display (LCD) device 1 and a personal computer (PC) 2, which are employed for the screen division scheme according to a first embodiment of the present invention.

FIG. 1 is a block diagram illustrating a liquid crystal display device (LCD) 1 and a personal computer (PC) 2, which are employed for the screen division method according to a first embodiment of the present invention. The LCD device 1 comprises: a thin film transistor (TFT) LCD array 3; a backlight 4; a gate driver 5; a data driver, i.e., a source driver 6; and LCD controller 7; and a backlight driver 8. According to the screen division method, the display screen of the TFT LCD array 3 is divided into three areas 3A, 3B and 3C.

Figure 2:
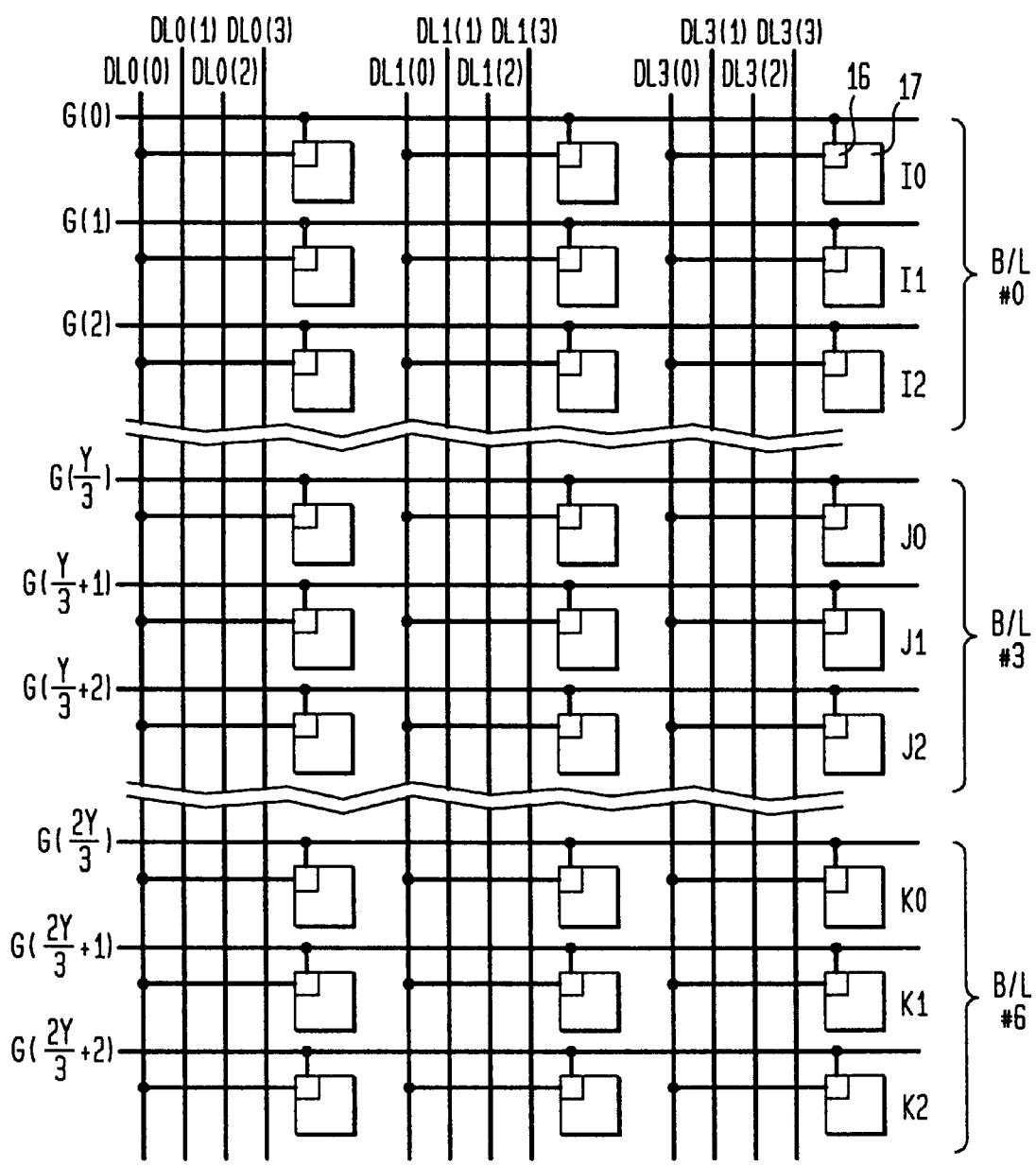
FIG. 2 is a diagram showing one part of a TFT LCD array wherein a plurality of gate lines are arranged horizontally and a plurality of data lines are arranged vertically.

In FIG. 2 is shown one part of the TFT LCD array 3. A plurality of gate lines are horizontally provided in the TFT LCD array 3, and a plurality of data lines are vertically provided in the TFT LCD array 3. One TFT that constitutes one picture element, i.e., one pixel (pel), is connected at each of the intersections of the gate lines and the data lines. A plurality of pels that are connected to a single gate line are collectively called a pel line. More specifically, a gate electrode in the TFT is connected to the gate line, a source electrode is connected to one of the four data lines, i.e., one of the four source lines, and a drain electrode is connected to a display electrode that is composed of indium tin oxide (ITO). When a gate pulse is applied to the gate lines by the gate driver 5 and a voltage signal representing data is applied to one of the data lines by the data driver 6, the TFT is turned on, the voltage signal is transmitted to a capacitor (not shown), and a charge accumulated in the capacitor is applied to the display electrode, so that the state of the liquid crystal molecules is changed from a state wherein light from the backlight is passed. The time required for switching from one state to another is called a response time $T_{res}$ for a liquid crystal material. The reason that four data lines are provided will be explained later.

The backlight 4 will now be described. The backlight 4 of the present invention is vertically divided into a plurality of backlight sections #0, #1, #2, . . . in the TFT LCD array 3. One backlight section is assigned for a predetermined number of pel lines. The ON/OFF states of the individual backlight sections are independently controlled by the backlight driver 8. Basically, the backlight sections are sequentially turned on or off from the top to the bottom of the TFT LCD array 3. The LCD controller 7 supplies image data, i.e., R, G and B data, through three data ports to the data driver 6 for controlling the operation of the data driver 6, and controls the gate driver 5 and the backlight driver 8 by using control lines 14 and 15. More specifically, the LCD controller 7 transmits a shift clock across the control lines 14 and 15 to the gate drive 5 and to the backlight driver 8. A signal "duty," which represents the number of backlights that are turned on at the same time, and a signal "shift," which represents the shifting distance for the backlight section, are transmitted to the backlight driver 8. In the first embodiment, concerning the screen division method, and the second embodiment, concerning a time division method, the value of the "duty" signal is "1," and the value of the "shift" signal is "1". Therefore, in the screen division method, one of N/3 backlight sections is temporarily turned on, following which the adjacent backlight section is turned on.

The PC 2 comprises: a video random access memory (VRAM) R 9 in which red (R) image data are stored; a VRAM G 10 in which green (G) image data are stored; a VRAM B 11 in which blue (B) image data are stored; and a video controller 12. The video controller 12 accesses the VRAM 9, 10 and 11 to transmit the R, G, B data the LCD controller 7.

Figure 3:
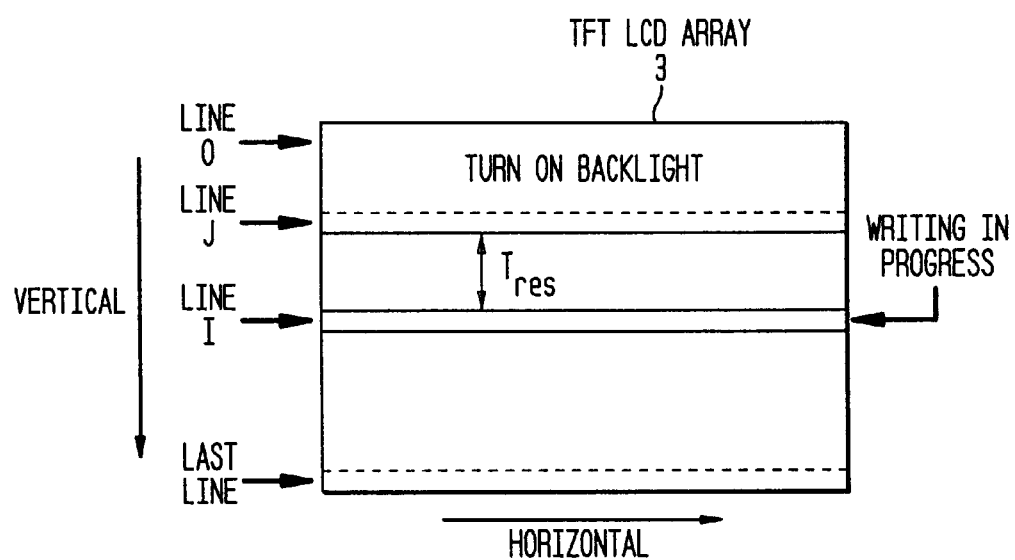
FIG. 3 is a diagram for explaining the number of backlight sections.

The number of backlight sections will now be explained while referring to FIG. 3. First, assume that the backlight 4 is divided into N backlight sections, and that the number 4 is divided into N backlight sections, and that the number of pel lines in the 1/N area is J+1. The image data are sequentially written to the TFT LCD array 3 beginning at the first line 0. The backlight sections assigned for the pel lines 0 to J can be turned on after the response time $T_{res}$ for the liquid crystal material of line J has elapsed. That is, when image data are written to lien I, the backlight sections assigned for the pel lines 0 to J are turned on. The backlight sections can be sequentially turned on until image data have been written across the last line. The ON period for the backlight section that illuminates the line J is called $T_{flash}$. Assuming that the frame frequency is $F_f$ (Hz), one frame period for displaying one of R, G and B images is $1/F_f$, and a sub-frame period is $\tfrac{1}{3} F_f$. The duty ratio that represents the illumination ratio is obtained from the following equation:

$$\text{Duty ratio} = T_{flash} \times F_f$$

wherein $t_{flash} = 1/(3 \times F_f) - 1/(3 \times F_f) \times 1/N - T_{res}$ (sec). Thus, the duty $(T_p) = \tfrac{1}{3} \times (1-1/N) - F_f \times T_{res}$. From the above equation, N is represented as $N = 1/[1 - 3 \times (T_D + F_f \times T_{res})]$.

When the parameters, i.e., the duty ratio, $F_f$ and $T_{res}$, are substituted into the above equation, N, i.e., the number of backlight sections, can be obtained. The following Table 1 shows the number of backlight sections when the duty ratio=0.1 (10%) and $T_{res}$=(ms).

TABLE 1

| $F_f$ (HZ) | 22 Hz | 40 Hz | 50 Hz | 60 Hz | 70 Hz |
|---|---|---|---|---|---|
| screen division method | N = 6 | N = 9 | N = 12 | N = 21 | N = 45 |
| time division method | N = 2 | N = 3 | N = 4 | N = 7 | N = 15 |

In the screen division method, N is a multiple of 3. It should be noted that N is equal to or greater than 6 and is smaller than the total count of the pel lines in the TFT LCD array 3. The time division method employed for the second embodiment will be described later.

Figure 4:
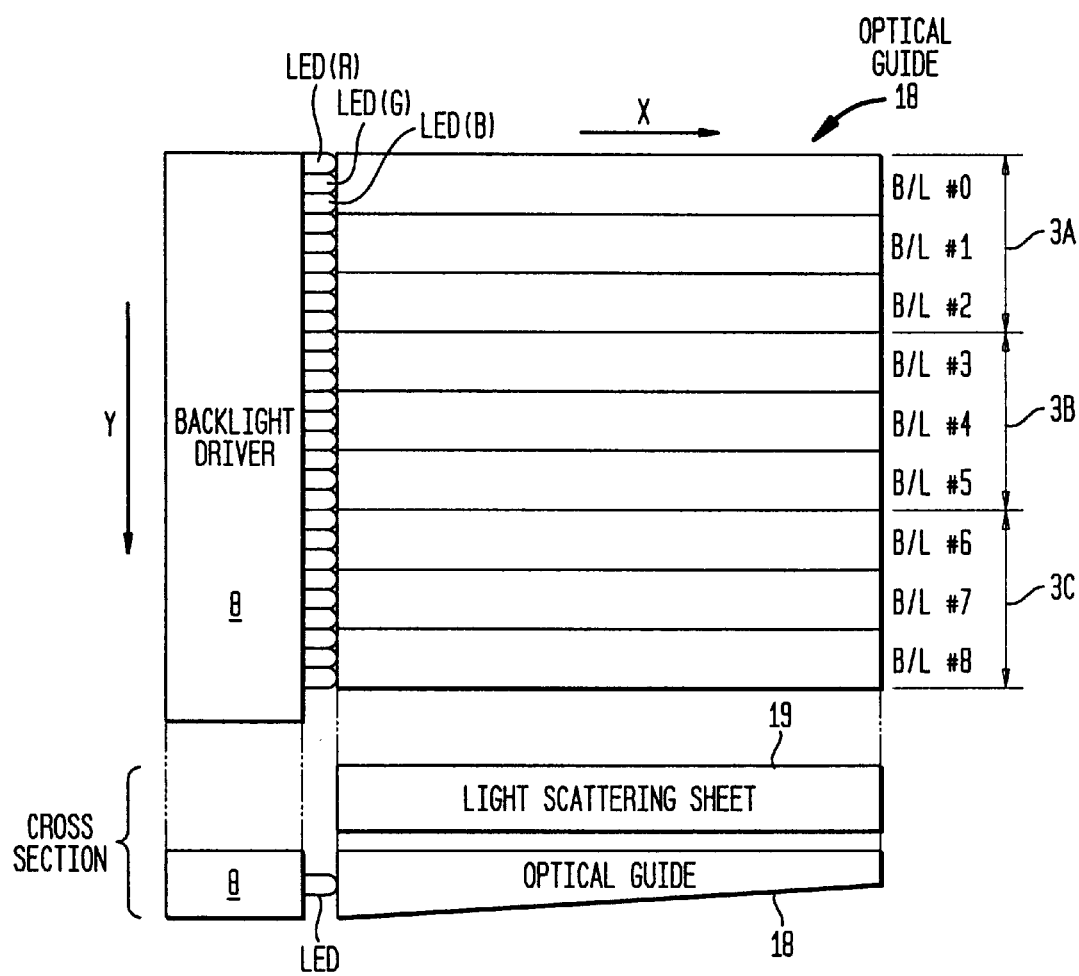
FIG. 4 is a diagram showing the relationship of backlight sections relative to three areas, 3A, 3B and 3C, of the TFT LCD array 3.

In FIG. 4 is shown the relationship between the backlight sections and the three areas 3A, 3B and 3C in the TFT LCD array 3. To simplify the screen illustration and the explanation, N=9 is employed in Table 1. The backlight sections #0, #1 and #2 are assigned for the first ⅓, area 3A, of the TFT LCD array 3; the backlight sections #3, #4 and #5 are assigned for the second ⅓, area 3B, of the TFT LCD array 3; and the backlight sections #6, #7 and #8 are assigned for the third ⅓, area 3C, of the TFT LCD array 3. The individual backlight sections each include a red (R) light-emitting diode (LED), a green (G) light-emitting diode (LED) and a blue (B) light-emitting diode (LED). The backlight driver 8 selectively activates one of the R, G and B LEDs. A cross section of the backlight is shown in the lower portion in FIG. 4. Light emitted from one of the R, G and B LEDs enters an optical guide 18, and the light reflected therefrom is forwarded to the TFT LCD array 3 through a light scattering sheet 19.

Figure 5:
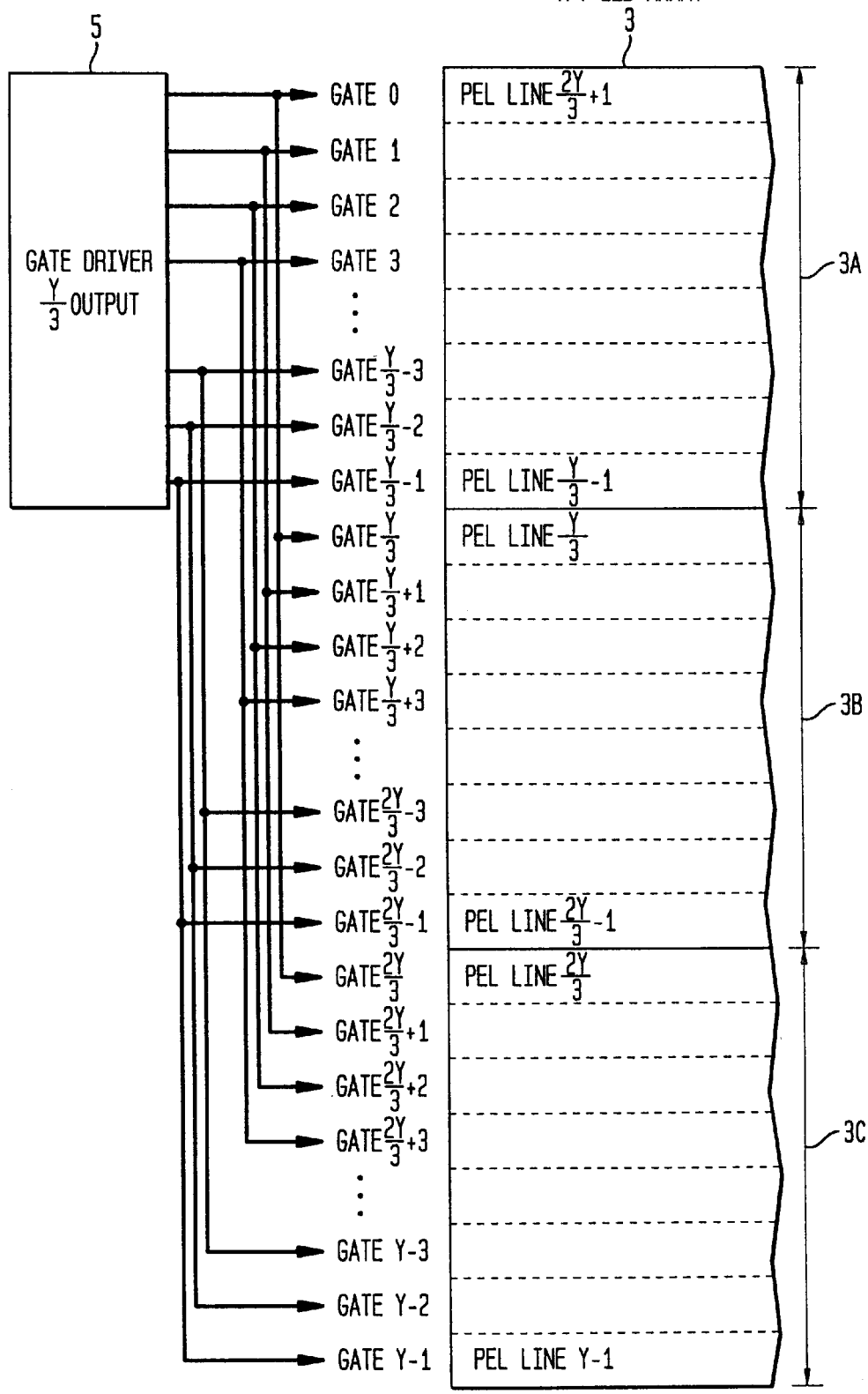
FIG. 5 is a diagram showing a screen division scheme gate driver that drives Y gate lines included in the TFT LCD array of X pels×Y pels.

In FIG. 5 is shown the gate driver 5 that drives Y gate lines in the TFT LCD array 3 that is composed of X pels×Y pels. The present invention can be applied for TFT LCD arrays that have the various resolutions shown in Table 2.

TABLE 2

| Scheme | XGA | SXGA | USGA | QXGA |
|---|---|---|---|---|
| Resolution (X × Y) | 1024 × 768 | 1280 × 1024 | 1600 × 1200 | 2048 × 1536 |

As was previously explained, the TFT LCD array 3 is divided into three areas, i.e., the first area 3A, the second area 3B and the third area 3C. The first, the second and the third areas 3A, 3B and 3C, each include Y/3 pel lines that extend horizontally. In the screen division method, the gate driver 5 has Y/3 gate lines. The gate driver 5 activates at the same time a gate line 0, which is forwarded to the first pel line 0 in the first area 3A, a gate line Y/3, which is forwarded to the first pel line Y/3 in the second area 3B, and a gate line 2Y/3, which is forwarded to the first pel line 2Y/3 in the third area 3C, and at the same time activates a gate line 1, which is forwarded to the second pel line 1 in the first area 3A, a gate line Y/3+1 in the second area 3B, and a gate line 2Y/3+1, which is forwarded to the second pel line 2Y/3+1 in the third area 3C.

Figure 6:
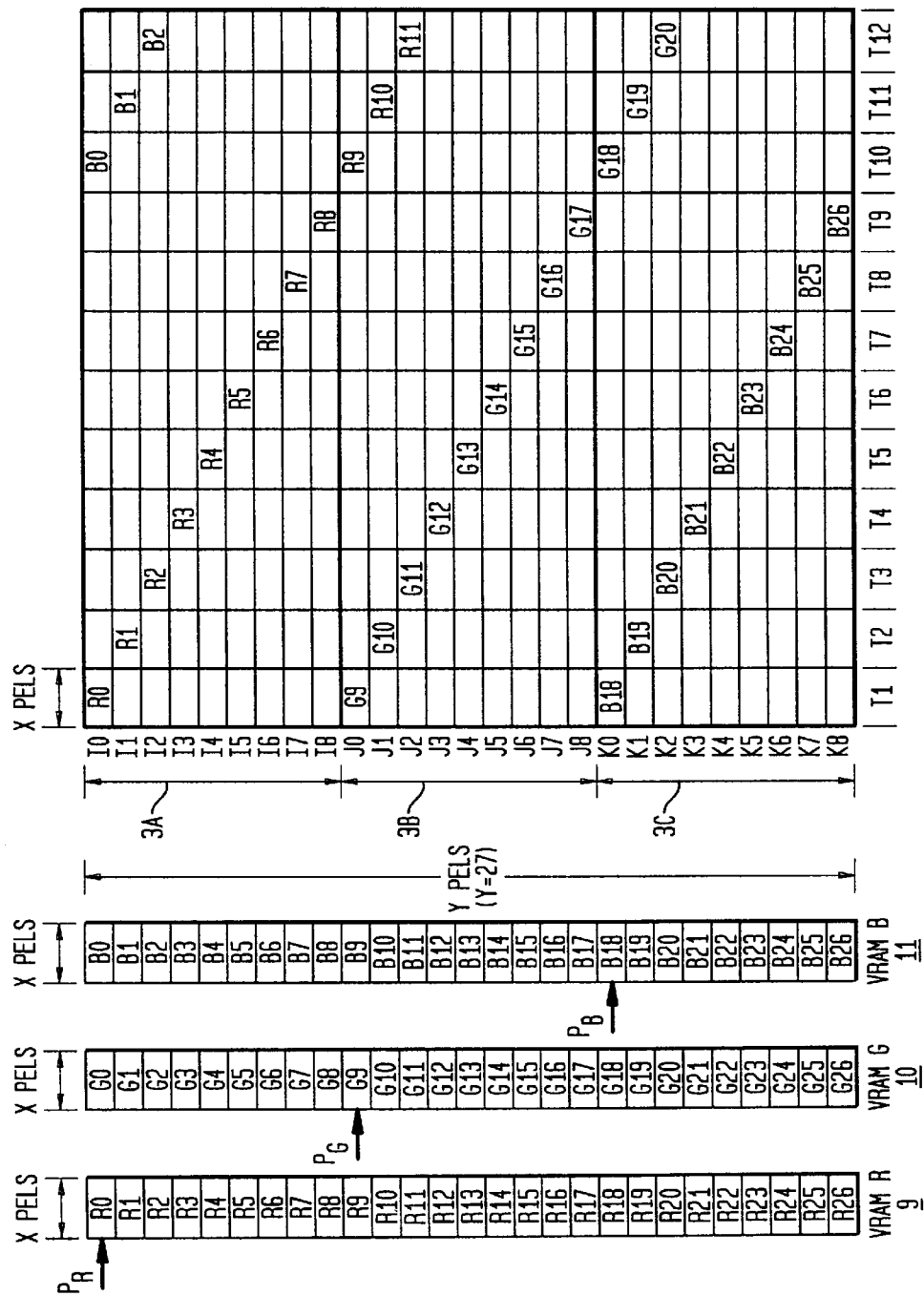
FIG. 6 is a diagram showing the processing for writing R, G and B image data in the areas 3A, 3B and 3C of the TFT LCD array.
Figure 7:
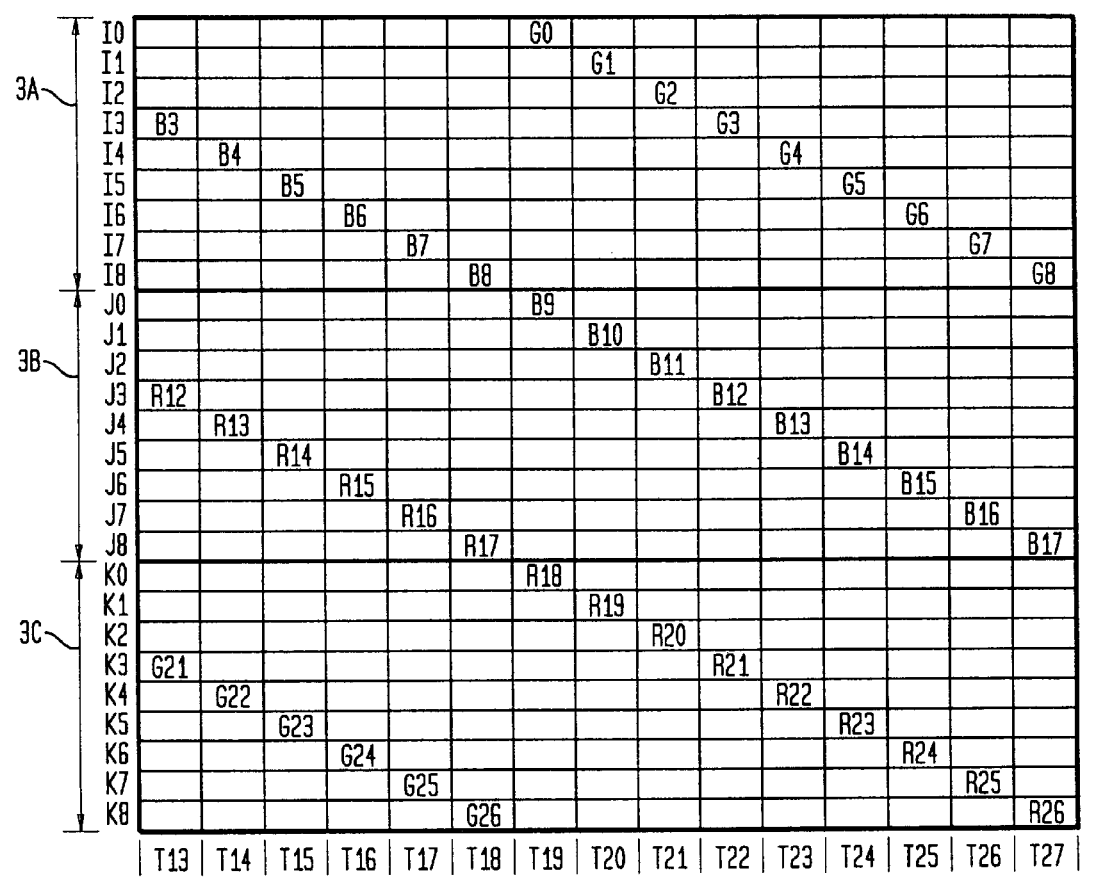

In FIGS. 6 and 7 are shown the writing operation where R, G and B image data in the VRAM R 9, the VRAM G 10 and the VRAM B 11 are written through the video controller 12 and the LCD controller 7 to the areas 3A, 3B and 3C in the TFT LCD array 3 during a time period represented by $1/F_f$ ($F_f$ is a frame frequency), i.e., during a period extending from the T1 to time T27. In FIG. 6, Xs represent the number of pels horizontally arranged in the TFT LCD array 3. It should be noted that the TFT LCD array 3 of X×Y pels is an elongated box that is extended vertically. To simplify the explanation, as was previously mentioned, the number of pels vertically arranged in the TFT LCD array 3 is Y=27.

Therefore, the first area 3A includes Y/3 pel lines, i.e., nine pel lines I0 to I8; the second area 3B includes Y/3 pel lines, i.e., nine pel lines J0 to J8; and the third area 3C includes Y/3 pel lines, i.e., nine pel lines K0 to K8. The pel line I0 corresponds to pel line 0 in FIG. 5, and the pel line I8 corresponds to pel line Y/3−1. The pel line J0 corresponds to pel line Y/3, and the pel line J8 corresponds to pel line 2Y/3−1. The pel line K0 corresponds to pel line Y−1.

The VRAM R 9 is used to store R data for X×Y pels, the VRAM G 10 is used to store G data for X×pels, and the VRAM B 11 is used to store B data for X×Y pels. The data to be stored in the VRAMs 9, 10 and 11 represent the data to be written to X pels across one pel line. If the SGA scheme in Table 2 is employed, the data in the individual locations in the VRAMs represent data for 1024 pels across one pel line in the TFT LCD array 3. For example, data R0 represents R data written 1024 pels across the pel line I0. Multilevel R data R0 to R26 are stored in the VRAM R 9, multilevel G data G0 to G26 are store in the VRAM G 10, and multilevel B data B0 to B26 are stored in the VRAM B 11. One R data set, one G data set, and one B data set are written at the same time to the three areas, 3A, 3B and 3C, in the TFT LCD array 3 during one write cycle TN (n=1, 2, 3, . . . ). The time extending from T1 to T27 represents a frame period $1/F_f$. The number of times T in the frame period equals the number of pel lines in the TFT LCD array 3. Pointers $P_R$, $P_G$ and $P_B$, for the VRAMs 9, 10 and 11 shown, in FIGS. 1 and 6, indicate the positions whereat the reading of data from the VRAMS is initiated. In this case., during the write cycle T1, the pointer $P_R$ points to data R0 in the VRAM R 9, the pointer $P_G$ points to data R0 in the VRAM R 9, the pointer $P_G$ points to data G9 in the VRAM G 10, and the pointer $P_B$ points to data B18 in the VRAM B 11. As is shown in FIGS. 6 and 7, during the period extending from T1 to time T27, R data R0 through R26 are sequentially written across the pel lines I0 to K8, G data G9 through G8 are sequentially written across the pel lines J0 to I8, and B data B18 through B17 are sequentially written to the pel lines K0 to J8. More specifically, at time T1, data R0, G9 and B18 are respectively written across pel lines I0, J0 and K0, at time T2, data R1, G10 and B19 are respectively written across pel lines I1, J1 and K1, and at time T3, data R2, G11 and B20 are respectively written across pel lines I2, J2 and K2. This process is repeated hereinafter.

The writing operation will be explained while referring to FIGS. 2, 5 and 6. At this T1, the gate driver 5 supplies a gate pulse to the gate lines 0, Y/3 and 2Y/3. The data driver 6 supplies data R0 to data lines DL0 (0) through DLX-1 (0), data G9 to data lines DL0 (1) through DLX-1 (1), and data B18 to data lines DL0 (3) through DLX-1 (3).

At time T2, the gate driver 5 supplies a gate pulse to the gate lines 1, Y/3+1 and 2Y/3+1. The data driver 6 supplies data R1 to data lines DL0 (1) through DLX-1 (1), data G10 to data lines DL0 (2) through DLX-1 (2), and data B19 to data lines DL0 (0) through DLX-1 (0).

At time T3, the gate driver 5 supplies a gate pulse to the gate lines 2, Y/3+2 and 2Y/3+2. The data driver 6 supplies data R2 to data lines DL0 (2) through DLX-1(2), data G11 to data lines DL0 (3) through DLX-1 (3), and data B20 to data lines DL0 (1) through DLX-1 (1). This operations is repeated during a plurality of frame cycles.

As is described above, the video controller 12 and the LCD controller 7 sequentially write the first color data, which are selected from R, G and B data, across Y pel lines beginning with the first pel line in the first area 3A continuing through the second area 3B and ending with the last pel line in the third area 3C; sequentially write the second color data, which are selected from R, G and B data, to Y pel lines beginning with the first pel line in the second area 3B, continuing through the third area 3C and ending with the last pel line in the first area 3A; and sequentially write the third color data, which are selected from R, G and B data, to Y pel lines beginning with the first pel line in the third area 3C, continuing through the first area 3A and ending with the last pel line in the second area 3B.

Figure 8:
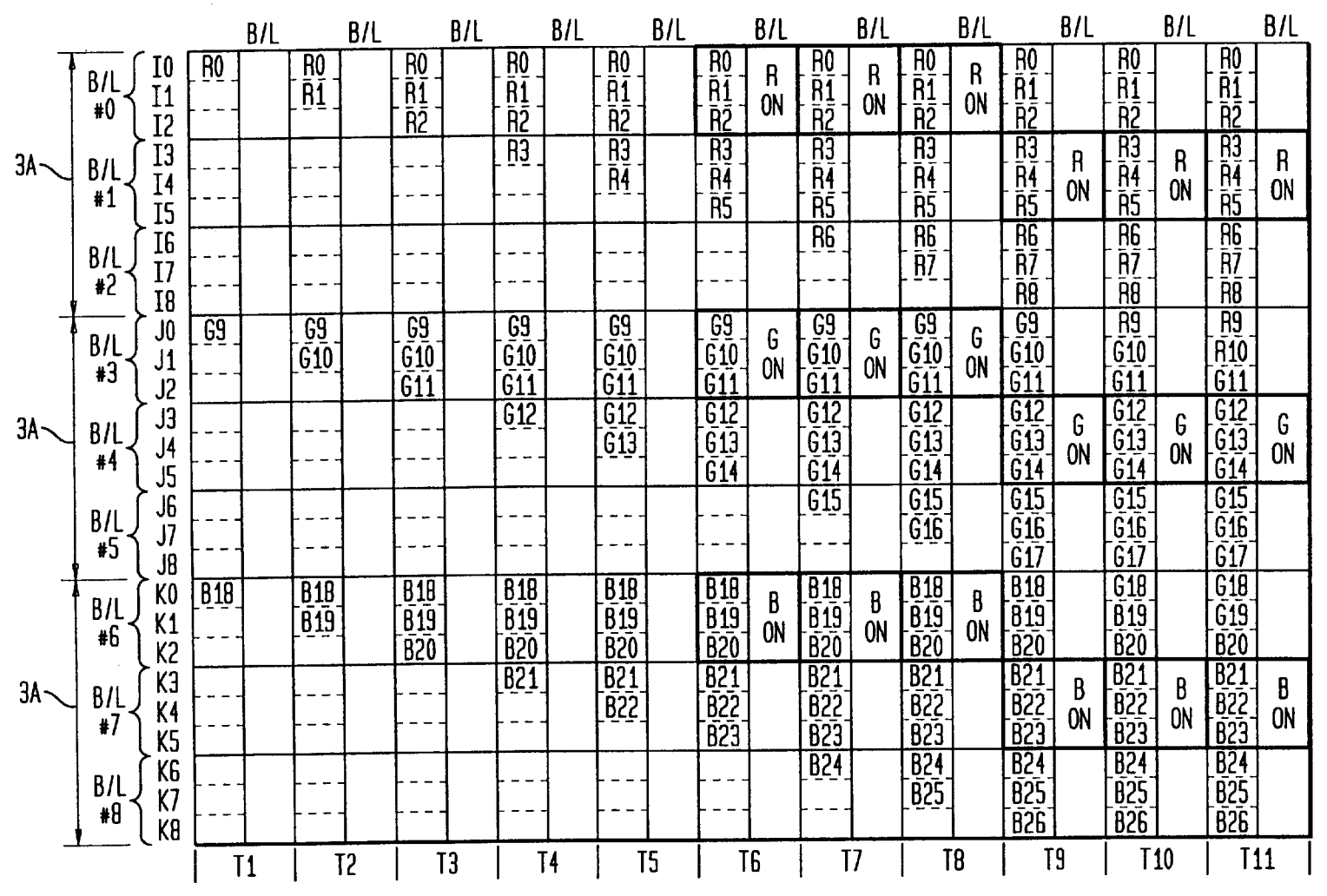
Figure 9:
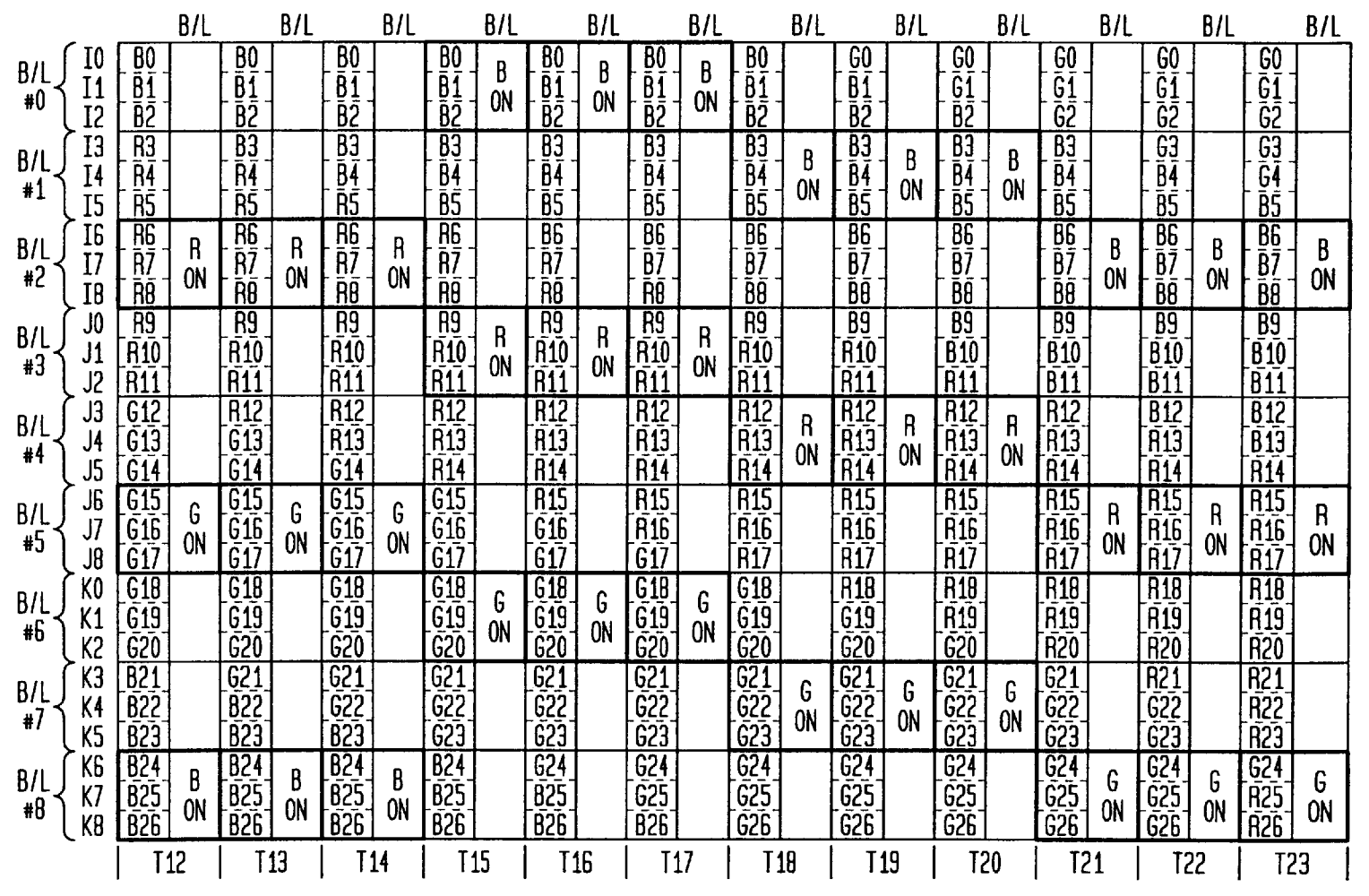
Figure 10:
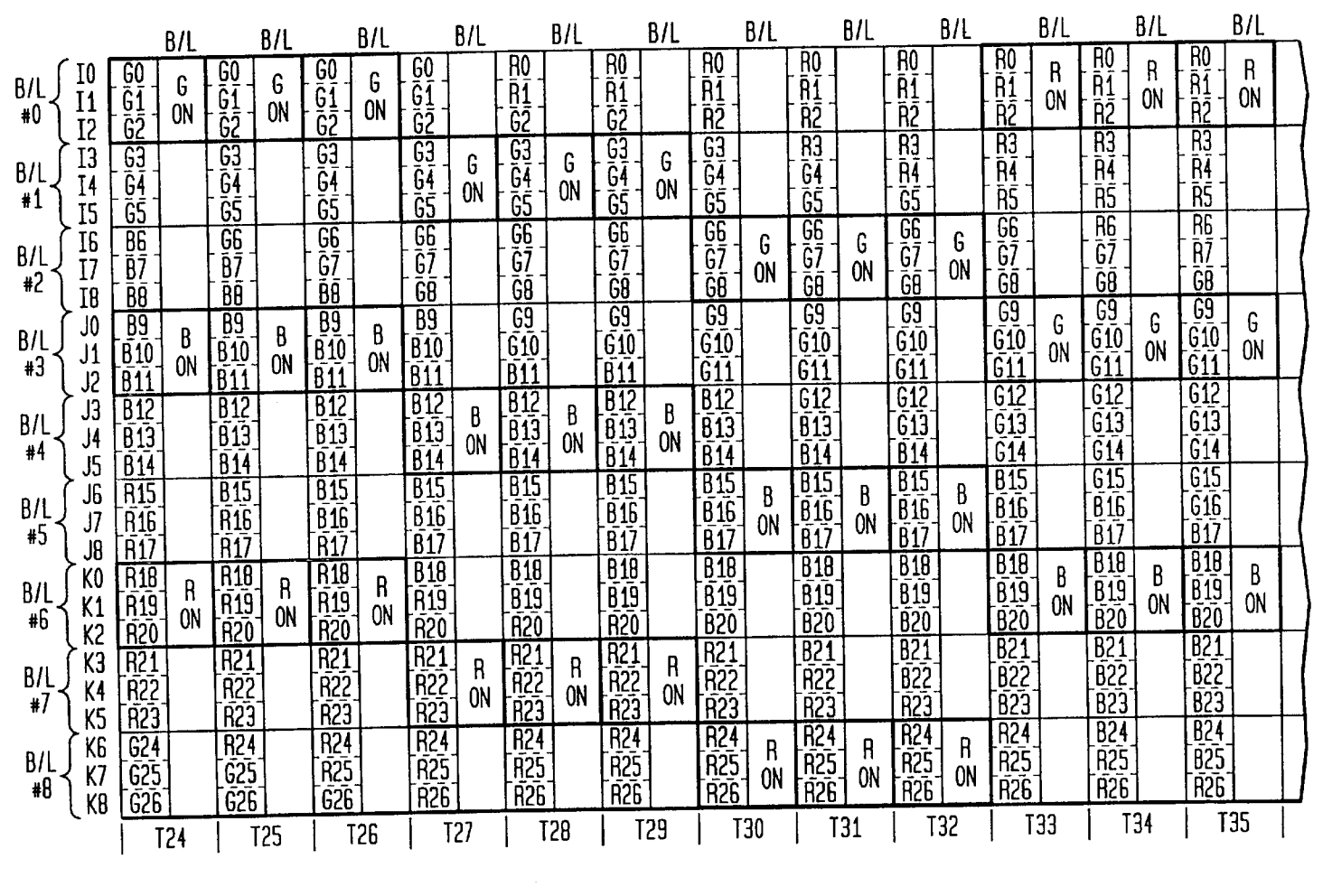

In FIGS. 8, 9 and 10 is shown the writing operation whereby R, G and B image data in the VRAM R 9, VRAM G 10 and VRAM B 11 are written to the areas 3A, 3B and 3C of the TFT LCD array 3 during a period extending from time T1 to time T35, and is also shown the control for the backlight sections #0 to #8. As was previously described, N=9 is employed as the number of backlights, and the first, the second and the third areas, 3A, 3B and 3C, are assigned for one sub-area. The backlight section #0, for example, is assigned for the sub-area that includes pel lines I0, I1 and I2. N/3 backlight sections #0 to #2 illuminate the first area 3A N/3 backlight sections #3 to #5 illuminate the second area 3B, and N/3 backlight sections #6 to #8 illuminate the third and 3C. The LCD controller 7 and the backlight driver 8 control the backlight sections #0 to #8, so that when either R, G or B data are written to one of the sub-areas, the backlight section assigned for the sub-area is turned on to generate a light having the same color as the color data. That is, the backlight section is turned on following the elapse of the response time for the liquid crystal material in the last pel line in the corresponding sub-area.

A period extending from time T1 to T27 represents the first frame period $1/F_f(s)$, and the second frame period starts at time T28 ($F_f$ is a frame frequency). The times T1 to T35 are shown in FIGS. 8 to 10 in order to explain the operation performed with the screen division method. In the initial state, all the backlight sections, #0 to #8, are turned off, and all the pixels or pels in the TFT LCD array 3 are reset, i.e., cleared.

One of the R, G and B LEDs for one backlight section is turned on following the elapse of the response time $T*_{res}$ for the liquid crystal material in the last pel line that the backlight section illuminates. In this example, the response time $T_{res}$ is equal to the sum of two periods, i.e., the sum of two write cycles. The ON operation for each backlight section is continued for a predetermined period, e.g., a time equivalent to the time allocated fro three write cycles. The R LED in the backlight section #0, for example, is turned on at time T6 following the elapse of the response time $T_{res}$ for the liquid crystal material in the pel line I2, e.g., following the elapse of the times T4 and T5. The ON state of the backlight section #0 is continued from time T6 to time T8. then during the response time $T_{res}$ for the liquid crystal material, and the ON period for the backlight section, the next data, e.g., R data R3 to R7, are written to the succeeding multiple pel lines.

The operation during a period extending from time T1 to time T8 is as follows:

Operation for R data:

During a period extending from time T1 to T3, data R0 to R2 are written across pel lines I0 to I2 in a sub-area for which the backlight section #0 is turned on at time T6, following the elapse of the response time $T_{res}$ for the liquid crystal material in the last pel line I2 that is illuminated by the backlight section #0. The ON state of the R LED for the backlight section #0 is continued from time T6 to time T8, and R data R0 to R2 are displayed. During the response time $T_{res}$, i.e., a period extending from time T4 to T5, and during the ON period for the backlight section #0, i.e., a period extending from time T6 to time T8, the succeeding data R3 to R7 are written across the succeeding pel lines I3 to I7. It should be noted that the R LED for the backlight section #0 is turned off before the next data B0 are written across the pel line I0 at time T10. Time T9 is used as a margin between the ON period for the backlight section #0 and the period for writing the next data B0.

Operation for G data:

During a period extending from time T1 to T3, data G9 to G11 are written across pel lines J0 to J2 in a sub-area for which the backlight section #3 is assigned. The G LED for the backlight section #3 is turned on at time T6, following the response time $T_{res}$ of the liquid crystal material in the last pel line J2 that is illuminated by the backlight section #3. The ON state for the G LED of the backlight section #3 is continued from time T6 to time T8, and G data G9 to G11 are displayed. During the response time $T_{res}$, i.e., a period extending from time T4 to T5, and during the ON period for the backlight section #3, i.e., a period extending from time T6 to time T8, the succeeding data G12 to G16 are written across the succeeding pel lines J3 to J7. It should be noted that the G LED for the backlight section #3 is turned off before the next data R9 are written to the pel line J0 at time T10. Time T9 is used as a margin between the ON period for the backlight section #3 and the period for writing the next data R9.

Operation for B data: During a period extending from time T1 to T3, data B18 to B20 are written across pel lines K0 to K2 in a sub-area for which the backlight section #6 is assigned. The B LED of the backlight section #6 is turned on at time T6, following the elapse of the response time $T_{res}$ for the liquid crystal material in the last pel line K2 that is illuminated by the backlight sections #6. The ON state of the B LED for the backlight section #6 is continued from time T6 to time T8, and B data B18 to B20 are displayed. During the response time $T_{res}$, i.e., a period extending from time T4 and T5, and during the ON period for the backlight section #6, i.e., a period extending from time T6 to time T8, the succeeding data B21 to B25 are written across the succeeding pel lines K3 to K7. It should be noted that the B LED for the backlight section #6 is turned off before the next data G18 are written across the pel line K0 at time T10. Time T9 is used as a margin between the ON period of the backlight section #6 and the period for writing the next data G18.

The operation during a period extending from time T9 to time T11 is as follows:

Operation for R data:

The LED for the backlight section #1 is turned on at time T9, following the elapse of the response time $T_{res}$ for the liquid crystal material in the last pel line I5 that is illuminated by the backlight section #1 is continued from time T9 to time T11, and R data R3 to R5 are displayed. During the ON period for the backlight section #1, the succeeding data R8 to R10 are written across the succeeding pel lines I8 to J1. It should be noted that the R LED for the backlight section #1 is turned off before the next data B3 are written across the pel line I3 at time T13. Time T12 is used as a margin between the ON period for the backlight section #1 and the period for writing the next data B3.

Operation for G data:

The G LED for the backlight section #4 is turned on at time T9, following the elapse of the response time $T_{res}$ for the liquid crystal material in the 1st pel line J5 that is illuminated by the backlight section #4. The ON state of the G LED for the backlight section #4 is continued from time T9 to time T11, and G data G12 to G14 are displayed. During the ON period for the backlight section #4, the succeeding G data G17 to G19 are written across the succeeding pel lines J8 to K1. It should be noted that the G LED for the backlight section #4 is turned off before the next data R12 are written across the pel line J3 at time T13. Time T12 is used as a margin between the ON period for the backlight section #4 and the period for writing the next data R12.

Operation for B data:

The B LED for the backlight section #7 is turned on at time T9, following the elapse of the response time $T_{res}$ for the liquid crystal material in the last pel line K% that is illuminated by the backlight section #7. The ON state of the B LED for the backlight section #7 is continued from T9 to time T11, and B data B21 to B23 are displayed. During the ON period for the backlight section #7, the succeeding B data B26, B0 and B1 are written across the succeeding pel lines K8, I0 to I1. It should be noted that the B LED for the backlight section #7 is turned off before the next data G21 are written across the pel line K3 at time T13. Time T12 is used as a margin between the ON period for the backlight section #7 and the period for writing the next data G21.

The operation during a period extending from time T12 to time T14 is as follows:

Operation for R data:

The R LED for the backlight section #2 is turned on at time T12, following the elapse of the response time $T_{res}$ for the liquid crystal material in the last pel line I8 that is illuminated by the backlight section #2. The ON state of the R LED for the backlight section #2 is continued from time T12 to time T14, and R data R6 to r8 are displayed. During the ON period for the backlight section #2, the succeeding data R11 to R13 are written across the succeeding pel lines J2 to J4. It should be noted that the R LED for the backlight section #2 is turned off before the next data B6 are written across the pel line I6 at time T16. Time T15 is used as a margin between the ON period for the backlight section #2 and the period for writing the next data B6.

Operation for G data: The G LED for the backlight section #5 is turned on at time T12, following the elapse of the response time $T_{res}$ for the liquid crystal material in the last pel line J8 that is illuminated by the backlight section #5. The ON state of the G LED for the backlight section #5 is continued from time T12 to time T14, and G data G15 to G17 are displayed. During the ON period for the backlight section #5, the succeeding G data G20 to G22 are written across the succeeding pel lines K2 to K4. It should be noted that the G LED for the backlight section #5 is turned off before the next data R 15 are written across the pel line J6 at time T16. Time T15 is used as a margin between the ON period for the backlight section #5 and the period for writing the next data R15.

Operation for B data:
The B LED for the backlight section #8 is turned on at time T12, following the elapse of the response time $T_{res}$ for the liquid crystal material in the last pel line K8 that is illuminated by the backlight section #8. The ON state of the B LED for the backlight section #8 is continued from time T12 to time T14, and B data B24 to B26 are displayed. During the ON period for the backlight section #8, the succeeding B data B2 to B4 are written across the succeeding pel lies I2 to I4. It should be noted that the B lED for the backlight section #8 is turned off before the next data G24 are written across the pel line K6 at time T16. Time T15 is used as a margin between the ON period for the backlight section #8 and the period for writing the next data G24. The operation during a period extending from time T15 to time T17 is as follows:

Operation for R data:
The R LED for the backlight section #3 is turned on at time T15, following the elapse of the response time $T_{res}$ for the liquid crystal material in the last pel line J2 that is illuminated by the backlight section #3. The ON state of the R LED for the backlight section #3 is continued from time T15 to time T17, and R data R9 to R11 are displayed. During the ON period for the backlight section #3, the succeeding data R14 to R16 are written across the succeeding pel lines J5 to J7 It should be noted that the R LED for the backlight section #3 is turned off before the next data B9 are written across the pel line J0 at time T19. Time T18 is used as a margin between the ON period for the backlight section #3 and the period for writing the next data B9.

Operation for G data:
The G LED for the backlight section #6 is turned on at time T15, following the elapse of the response time $T_{res}$ for the liquid crystal material in the last pel line K2 that is illuminated by the backlight section #6. The ON state of the G LED for the backlight section #6 is continued from time T15 to time T17, and G data G18 to G20 are displayed. During the ON period for the backliqht section #6, the succeeding G data G23 to G25 are written across the succeeding pel lines K5 to K7. It should be noted that the G LE for the backlight section #6 is turned off before the next data R18 are written across the pel line K0 at time T19. Time T18 is used as a margin between the ON period for the backlight section #6 and the period for writing the next data R18.

Operation for B data:
The B LED for the backlight section #0 is turned on at time T15, following the elapse of the response time $T_{res}$ for liquid crystal material in the last pel line I2 that is illuminated by the backlight section #0. The ON state of the B LED for the backlight section #0 continued from time T15 to time T17, and B data B0 to B2 are displayed. During the ON period for the backlight section #0, the succeeding B data B5 to B7 are written across the succeeding pel lines I5 to I7. It should be noted that the B LED for the backlight section #0 is turned off before the next data G0 are written across the pel line I0 at time T19. Time T18 is used as a margin between the ON period for the backlight section #0 and the period for writing the next data G0.

The above described operation for displaying R, G and B data is repeated as shown in FIGS. 9 and 10. During the display operation, the R LEDs for the backlight sections #0 to #8 are sequentially turned on to display R data. As is shown is FIG. 10, during the second frame period extending from time T28 to T35, data R0 to R7 are again written across the pel lines I0 to I7. The R LEDs for the backlight section #0 to #8 are turned on following the elapse of the response time $T_{res}$ for the liquid crystal material in the last pel lines that are illuminated by the backlight sections #0 to #8. The R LEDs for the backlight sections #0 to #8 remain on for a predetermined period in order to display R data. The G LEDs of the backlight sections #3 to #2 are sequentially turned on to display G data. As is shown in FIG. 10, in the second frame period extending from time T28 to T35, data G9 to G16 are again written across the pel lines J0 to J7. The G LEDs for the backlight sections #3 to #2 are turned on following the elapse of the response time $T_{res}$ for the liquid crystal material in the last pel lines that are illuminated by the backlight sections #3 and #2. The G LEDs for the backlight sections #3 to #2 remain on for a predetermined period in order to display G data. The B LEDs for the backlight sections #6 to #5 are sequentially turned on to display B data. As is shown in FIG. 10, in the second frame period extending from time T28 to T35, data B18 to B25 are again written across the pel lines K0 to K7. The B LEDs for the backlight sections #6 to #5 are turned on following the elapse of the response time $T_{res}$ for the liquid crystal material in the last pel lines that are illuminated by the backlight sections #6 to #5. The B LEDs for the backlight sections #6 to #5 remain on for a predetermined period in order to display B data.

As is apparent from the above description, the first area 3A, the second area 3B and the third area 3C are each divided into N/3 sub-areas, each of which includes a plurality of pel lines. While one part of the color data, e.g., color data R0 to R2 written in a specific sub-area that includes line I0 to I2, is displayed by R light that is emitted by the R LED for he backlight section #0 that is assigned for the specific sub-area, another part of the color data, e.g., data R5 to R7, is written to pel lines I5 to I7 in the succeeding two sub-areas.

The first color data, e.g., R data R0 to R2, the second color data, e.g., B data B0 to B2, and the third color data, e.g., G data G0 to G2, are written sequentially at predetermined intervals in a specific sub-area, e.g., a sub-area including pel lines I0 to I2. Then, the backlight section assigned for the sub-area, e.g., a backlight section #0, generates a light for the first color after the first color data, R data, have been written to the sub-area, generates a light for the second color after the second color data, B data, have been written to the sub-area, and generates a light for the third color after the third color data, G data, have been written in the sub-area.

Table 3 shows the timings for the display of R, G and B color images on the pel lines during the first frame period, extending from time T1 to T27, and during the second frame period, extending from time T28 to T35.

TABLE 3

| B/L section | Pel line | R color | G color | B color |
|---|---|---|---|---|
| #0 | I0–I2 | T6–T8 | T24–T26 | T15–T17 |
| #1 | I3–T5 | T9–T11 | T27–T29 | T18–T20 |
| #2 | I6–I8 | T12–T14 | T30–T-32 | T21–T23 |
| #3 | J0–J2 | T15–T17 | T6–T8 | T24–T26 |
| #4 | J3–J5 | T18–T20 | T9–T11 | T-27–T29 |
| #5 | J6–J8 | T21–T23 | T12–T14 | T30–T32 |
| #6 | K0–K2 | T24–T26 | T15–T17 | T33–T35 |
| #7 | K3–K5 | T27–T29 | T18–T20 | T9–T11 |
| #8 | K6–K8 | T30–T32 | T21–T23 | T-12–T-14 |

The above operation is repeated to display color images on the TFT LCD array 3.

As was previously described, according to the screen division method, N is a multiple of 3 that is equal to or greater than 6 and is smaller than the total count of pel lines included in the TFT LCD array 3. The reason that N is a multiple of 3 that is equal to or greater than 6 is as follows. If "3" is employed for N, one backlight section can be used for the first area 3A, the second backlight section can be used for the second area 3B, and the third backlight section can be used for the third area 3C. As for the operation performed for the first area 3A, as is shown in FIG. 8, R data R0 to R8 are written across pel lines I0 to I8 during a period extending from T1 to T9, and the succeeding B data B0 are written across the pel line I0 at time T10. After the R data R0 to R8 have been written, the backlight section for the first area 3A must be turned on to display these data, and must be turned off before the succeeding data, and must be turned off before the succeeding data B0 are written. If the liquid crystal material has an extremely fast switching speed, the backlight section may be turned on for the time extending from time T9 to time T10. However, switching the state of the liquid crystal materials withing such a short time is impossible. Therefore, the value of N is set to a multiple of 3, and is equal to or greater than 6.

Figure 11:
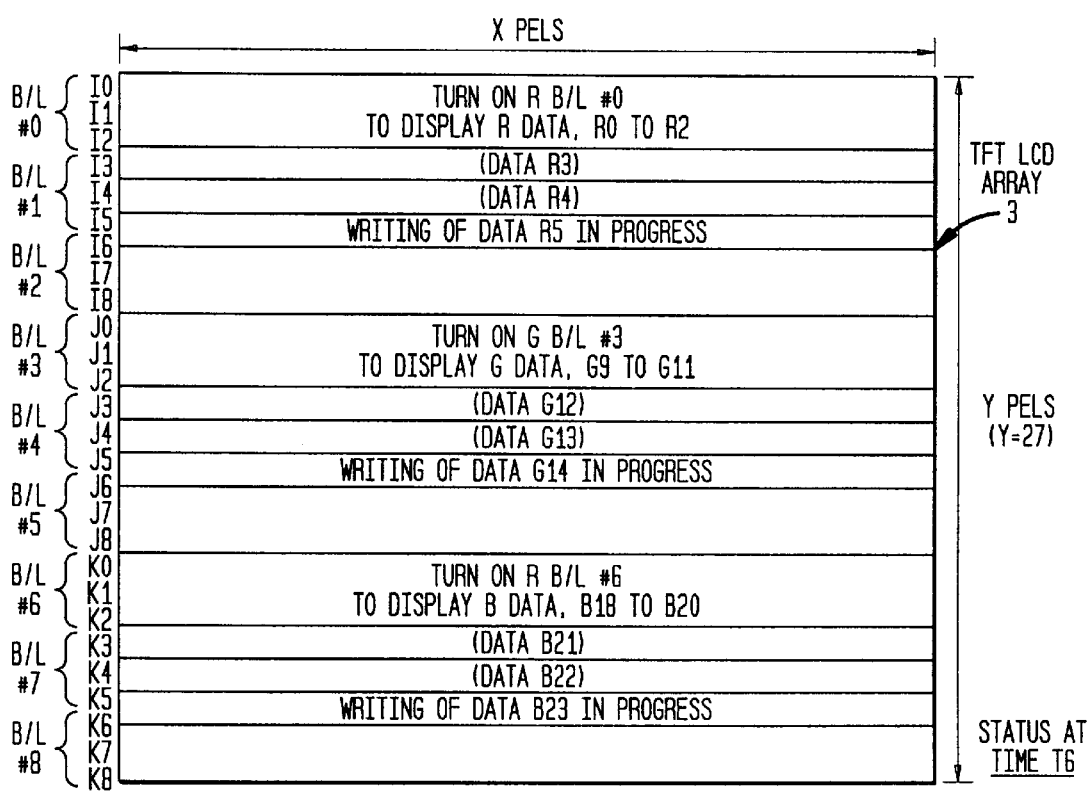
FIG. 11 is a diagram showing the status of images displayed on the TFT LCD array 3 at time T6.
Figure 12:
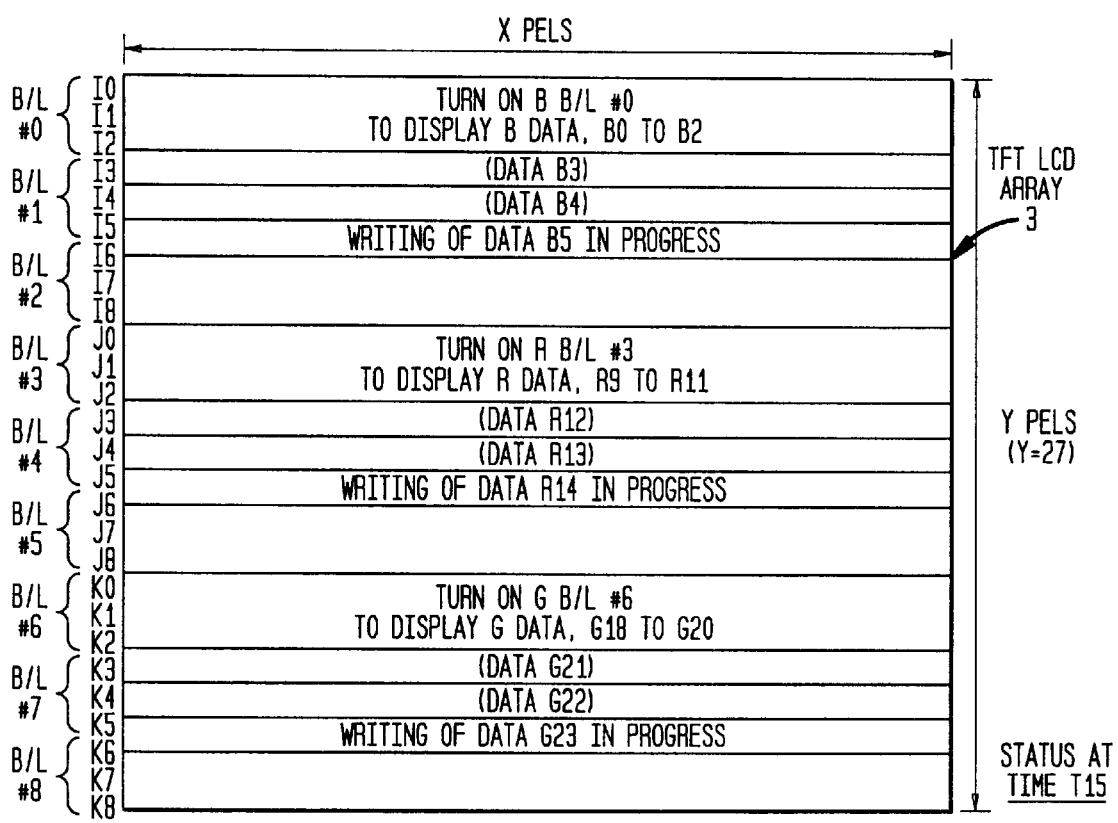
FIG. 12 is a diagram showing the status of images displayed on the TFT LCD array 3 at time T15.

In FIGS. 11 and 12 are shown the statuses of an image displayed on the TFT LCD array at time T6 and T15. In FIG. 11, at time T6, while data R5 are being written across pel line I5, the R LED for the backlight section #0 is turned on. Accordingly, R data on pel lines I0 to I2 are displayed and the R data on the pel lines I3 to I5 are not displayed. While data G14 are being written across pel line J5, the G LED for the backlight section #3 is turned on. Accordingly, the G image data on the pel lines J3 to J5 are not displayed, and the G data on the pel lines J3 to J5 are not displayed. While data B23 are being written across pel line K5, the B LED for the backlight section #6 is turned on. Accordingly, the B image data on the pel lines K0 to K2 are displayed, and the B data on the pel lines K3 to K5 are not displayed.

In FIG. 12, at time T15, while data B5 are being written across pel line I5, the B LED for the backlight section #0 is turned on. Accordingly, B image data on pel lines I0 to I2 are displayed and the B data on the pel lines I3 to I5 are not displayed. While data R14 are being written across pel line J5, the R LED for the backlight section #3 is turned on. Accordingly, the R image data on the pel lines J0 to J2 are displayed, and the R data on the pel lines J3 to J5 are not displayed. While data G23 are being written across pel line K5, the G LED for the backlight section #6 is turned on. Accordingly, the G image data on the pel lines K0 to K2 are displayed, and the G data on the pel lines K3 to K5 are not displayed.

In the first embodiment, the TFT LCD array 3 is divided into three areas, 3A, 3B and 3C, that are driven by a single data driver 6. In the second embodiment, a data driver can be provided on the upper side and lower side of the TFT LCD array 3. In this embodiment, the display area for the TFT LCD array 3 is divided into an upper half and a lower half, and the upper half portion is further divided into three areas, 3A, 3B and 3C, each of which is driven by the data driver provided on the upper side. Similarly, the lower half portion is divided into three areas, 3A, 3B and 3C, each of which is driven by the data driver provided on the lower side.

Figure 13:
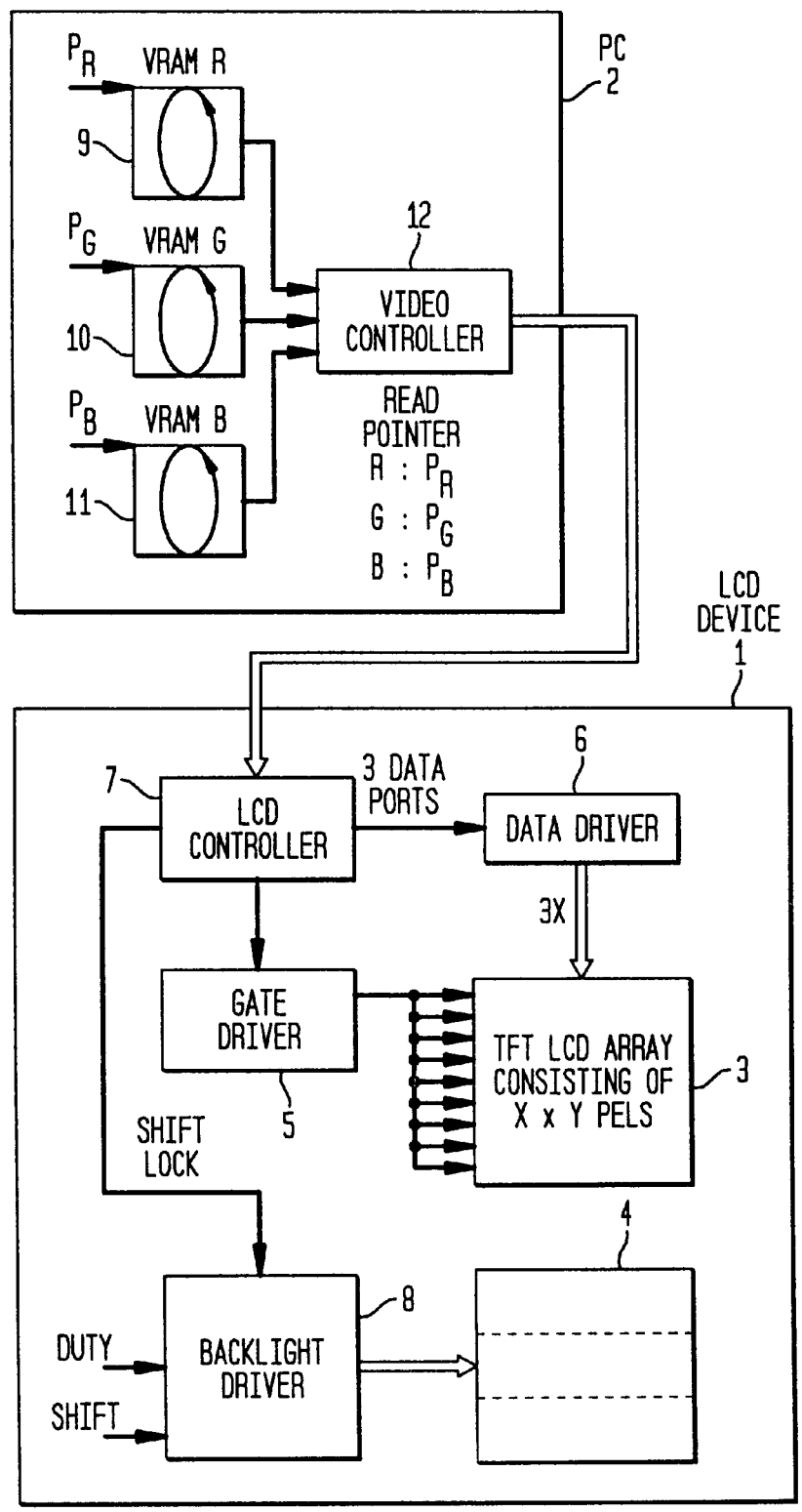
FIG. 13 is a block diagram illustrating a liquid crystal display (LCD) device and a personal computer (PC), which are employed for the time division scheme according to a second embodiment of the present invention.

FIG. 13 is a block diagram illustrating a liquid crystal display (LCD) device and a personal computer (PC) 2 that are employed for the time division method according to the second embodiment of the present invention. Since the essential blocks in FIG. 13 are substantially the same as those in FIG. 1, the same reference numerals are used to denote these components, and no detailed explanation for them will be given. As in the screen division method in the first embodiment, the TFT LCD array 3 includes horizontal X pels and vertical Y pels. In this embodiment, Y=27 is also employed. The differences between the time division method in FIG. 13 and the screen division method are: the simultaneous writing of R, G and B data, as is inherent to the screen division scheme, is not performed; the number of backlight sections, if the same frame frequency is employed, is smaller than that for the screen division scheme; the pointers $P_R$, $P_G$ and $P_B$, which point to start positions for the reading of R, G and B data, point to the first addresses in the VRAM R 9, the VRAM G 10 and the VRAM B 11; and the connection of the gate lines and the data lines to the TFT differ from procedure for the screen division scheme.

Figure 14:
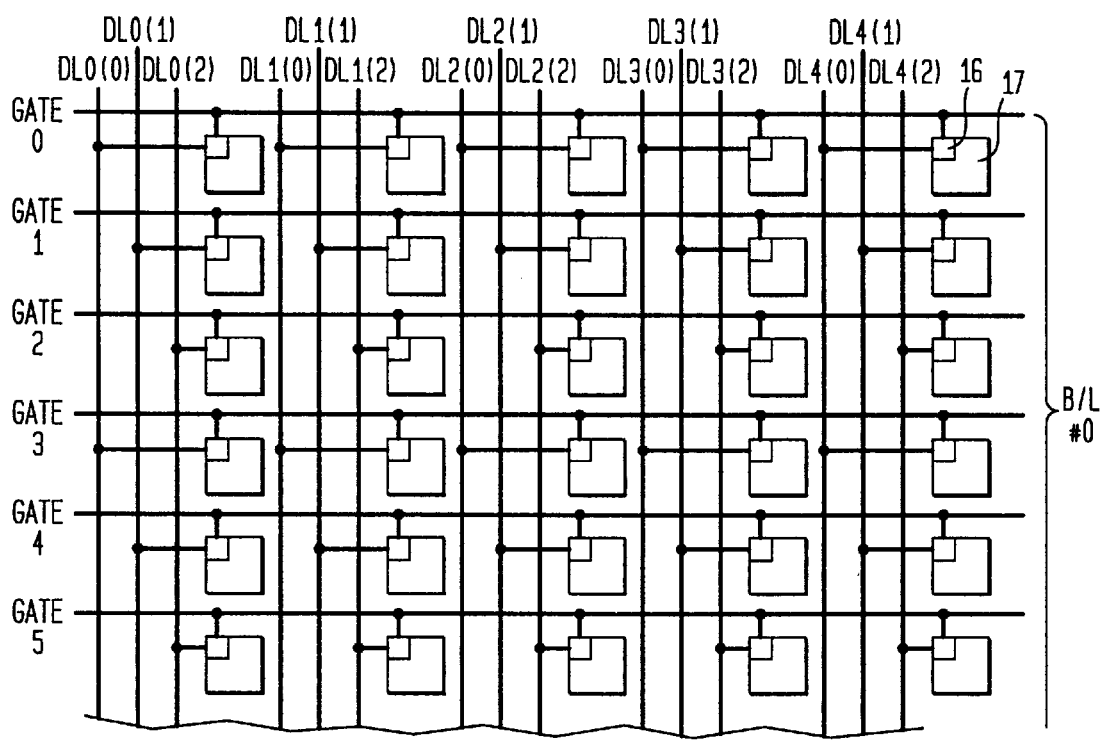
FIG. 14 is a diagram showing the connection of lines originating at the data driver to data lines in the time division scheme.

In FIG. 14 is shown the connections in the time division scheme for data lines originating at the data driver 6. Three data lines DL0 (0), DL0 (1) and DL0 (2), are connected to the source electrodes of the TFT 16.

Figure 15:
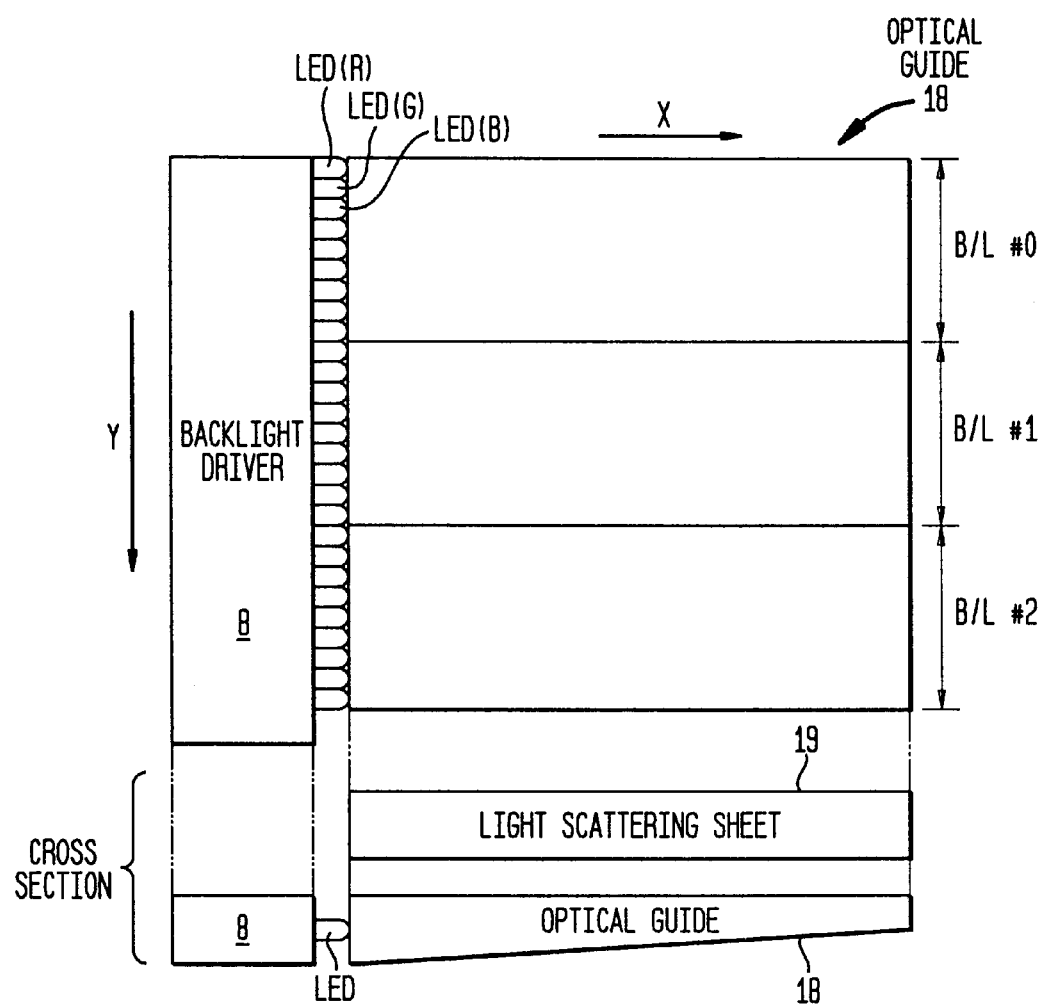
FIG. 15 is a diagram showing the relationship of backlight sections relative to the TFT LCD array in the time division scheme.

In FIG. 15 is shown the relationship between the backlight sections and the display areas in the TFT LCD array 3. In the time division scheme, the number of backlight sections, N, is equal to or greater than 1, and is smaller than the total count of the pel lines included in the TFT LCD array 3. To simplify the drawings and the description, in Table 1 N=3 is employed. The backlight section (B/L) #0 is assigned for the first ⅓ area of the TFT LCD array 3, the backlight section (B/L) #1 is assigned for the second ⅓ area of the TFT LCD array 3, and the backlight section (B/L) #2 is assigned for the third ⅓ area of the TFT LCD array 3. The backlight sections each include R (red), G (green) and B (blued) LEDs. The backlight driver 8 selectively activates the R, G and B LEDs.

Figure 16:
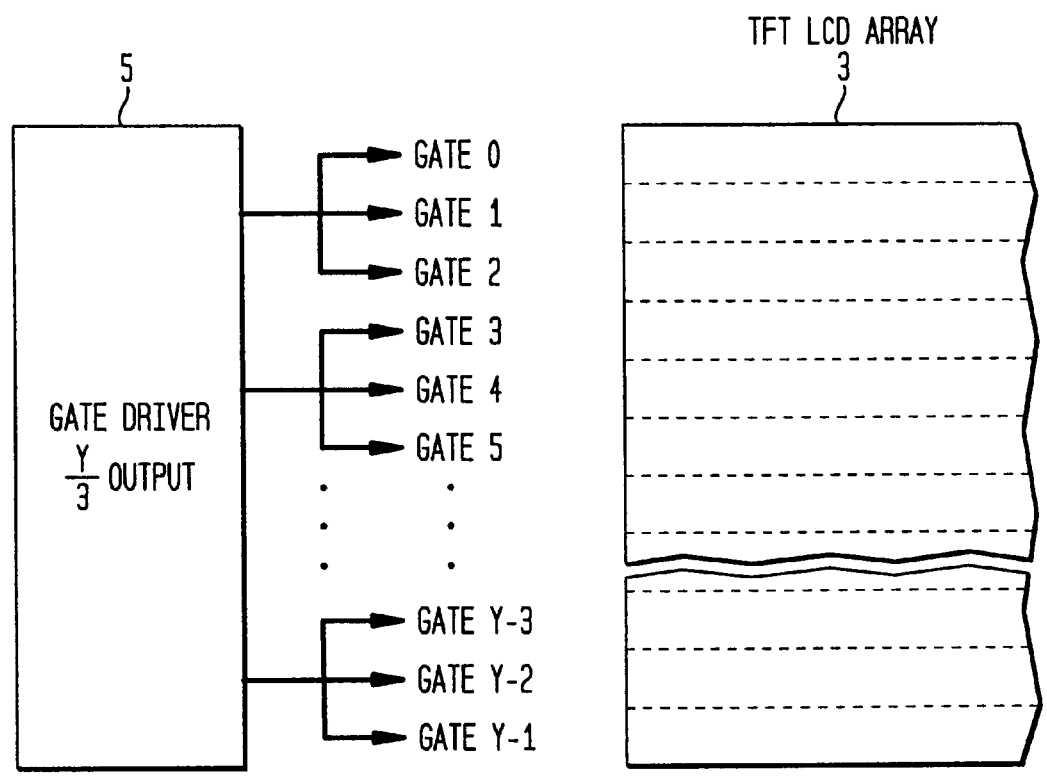
FIG. 16 is a diagram showing a time division scheme gate driver 5 that drives Y gate lines in the TFT LCD array of X pels×Y pels.

In FIG. 16 is shown the gate driver 5 for driving Y gate lines in the TFT LCD array 3 consisting of X pels×Y pels. The gate driver 5 activates a plurality of gate lines at the same time. In this embodiment, the gate driver 5 activates three gate lines at a time, and therefore, has Y/3 gate output lines, as in the screen division scheme. More specifically, the gate driver 5 simultaneously activates gate lines 0 to 2, then activates gate lines 3 to 5, and thereinafter activates the remaining gate lines in order.

Figure 17:
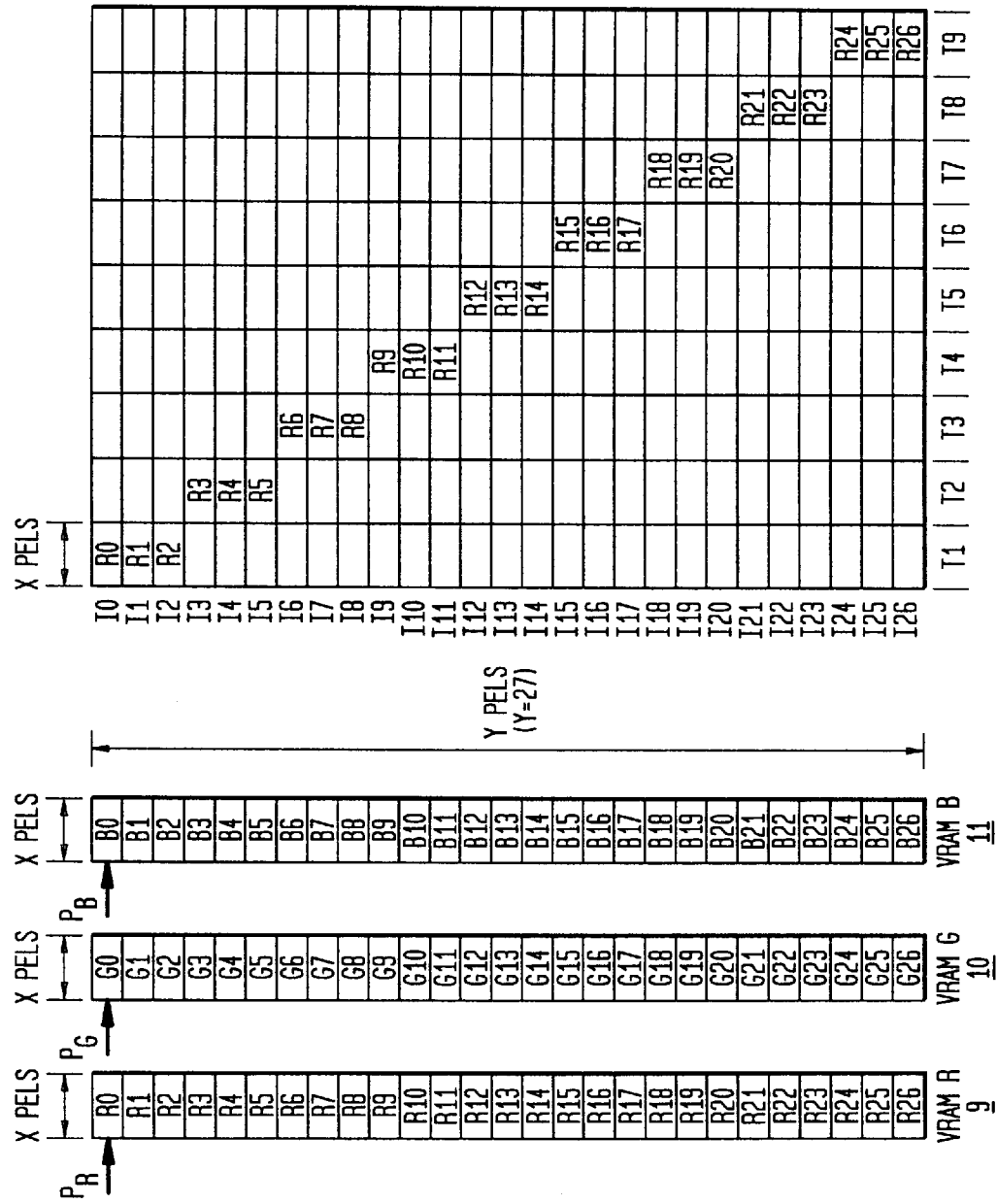
FIG. 17 is a diagram showing the processing in the time division scheme for writing R, G and B image data in the display areas of the TFT LCD array.
Figure 18:
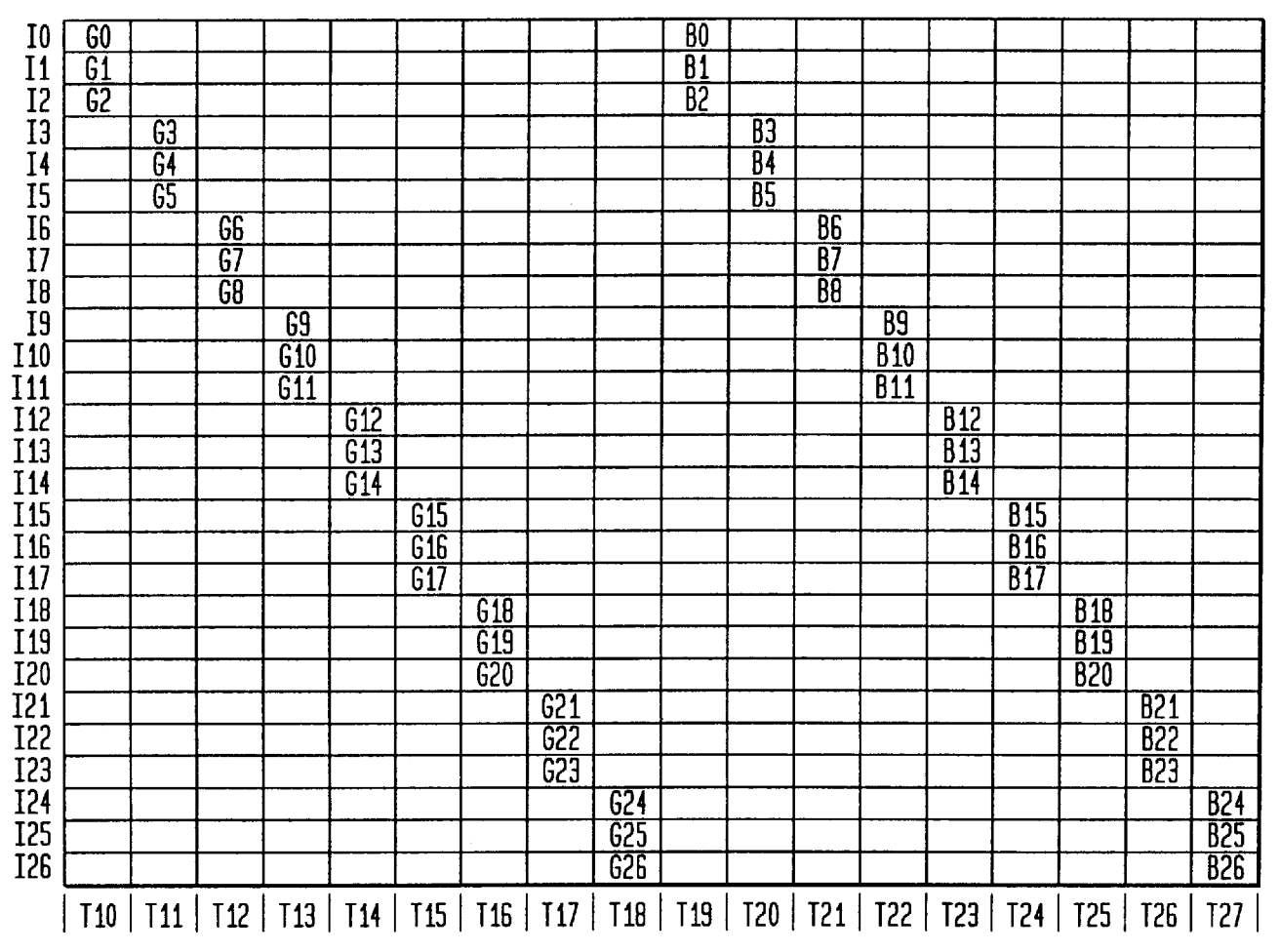

FIGS. 17 and 18 are shown the writing operation whereby R, G and B image data, from the VRAM R 9, the VRAM G 10 and the VRAM B 11, are transmitted through the video controller 12 and the LCD controller 7 and are written in the display areas in the TFT LCD array 3 during a period represented by $1/F_f$ ($F_f$ is a frame frequency), i.e., during a period extending from time T1 to time T27. As is explained while referring to FIGS. 6 and 7, Xs represent the number of the pels horizontally arranged in the TFT LCD array 3. It should be noted that the TFT LCD array 3 of X×Y pels is an elongated box that is extended vertically. Since Y–27 is also employed in the second embodiment, the TFT LCD array 3 has 27 pel lines, I0 to I26. In this embodiment, 27 pel lines are sorted into nine pel line groups, each of which includes three pel lines. For example, the first pel line group includes pel line I0 to I2, and the last pel line group includes pel lines I24 and I26. Therefore, color data are written across three pel lines at a time. It is preferable that for high speed processing each pel line group include at least two pel lines, but it is also possible to write color data across a single pel line at a time.

As in the screen division scheme, the VRAM R9 is used to store R data for X×Y pels, the VRAM G 10 is used to store G data for X×Y pels, and the VRAM B 11 is used to store B data for X×Y pels. The data to be stored in the VRAMs 9, 10 and 11 represent the data that is to be written to X pels across one pel line. Multilevel R data R0 to R26 are stored in the RAM R 9, multilevel G data G0 to G26 are stored in the VRAM G 10, and multilevel B data B0 to B26 are stored in the VRAM B11. The time extending from T1 to T27 represents a frame period $1/F_f$. The number of times T in the frame period equals the number of pel lines in the TFT LCD array 3. Pointers $P_R$, $P_G$ and $P_B$, for the VRAMs 9, 10 and 11 shown in FIG. 13 and 17, indicate the positions whereat the reading of data from the VRAMs is initiated. In this case, during the write cycle T1, the pointer $P_R$ points to data R0 in the VRAM R 9, the pointer $P_G$ points to data G0 in the VRAM G 10, and the pointer $P_B$ points to data B0 in the VRAM B11.

In this embodiment employing the time division scheme, at time T a plurality of data sets for the same color, i.e., three data sets, are written across one pel line group of the TFT LCD array 3. The writing operation performed by the video controller 12 and the LCD controller 7 will now be described while referring to FIGS. 14, 16 and 17. At time T1, the gate driver 5 supplies a gate pulse to the gate lines 0, 1 and 2. The data driver 6 supplies data R0 to data lines DL0 (0) through DLX-1 (0), data R1 to data lines DL0 (1) through DLX-1 (1), and data R2 to data lines DL0 (2) through DLX-1 (2). As a result, data R0 to R2 are written across the pel lines I0 to I2.

At time T2, the gate driver 5 supplies a gate pulse to the gate lines 3, 4 and 5. The data driver 6 supplies data R3 to data lines DL0 (0) through DLX-1 (0), data R4 to data lines DL0 (1) through DLX-1 (1), and data R5 to data lines DL0 (2) through DLX-1 (2). As a result, data Re to R5 are written across the pel lines I3 to I5. The writing operation is repeated until at time T9 data R24 to R26 are written across pel lines I24 to I26.

When R data R0 to R26 have been written to the TFT LCD array 3 during a period extending from time T1 to T9, at time T10 writing of data G0 to G2 across pel lines I0 to I2 is initiated, and during a period extending from time T10 to T18 G data G0 to G26 are written across pel lines I0 to I26. When G data G0 to G26 have been written to the TFT LCD array 3 during a period extending from time T10 to T18, at time T19 writing of data B0 to B2 across pel lines I0 to I2 is initiated, and during a period extending from time T19 to T27 B data B0 to B26 are written across pel lines I0 to I26. In this manner, R, G and B data are written to the TFT LCD array 3 during a frame period $1/F_f$ extending from T1 to T27.

Figure 19:
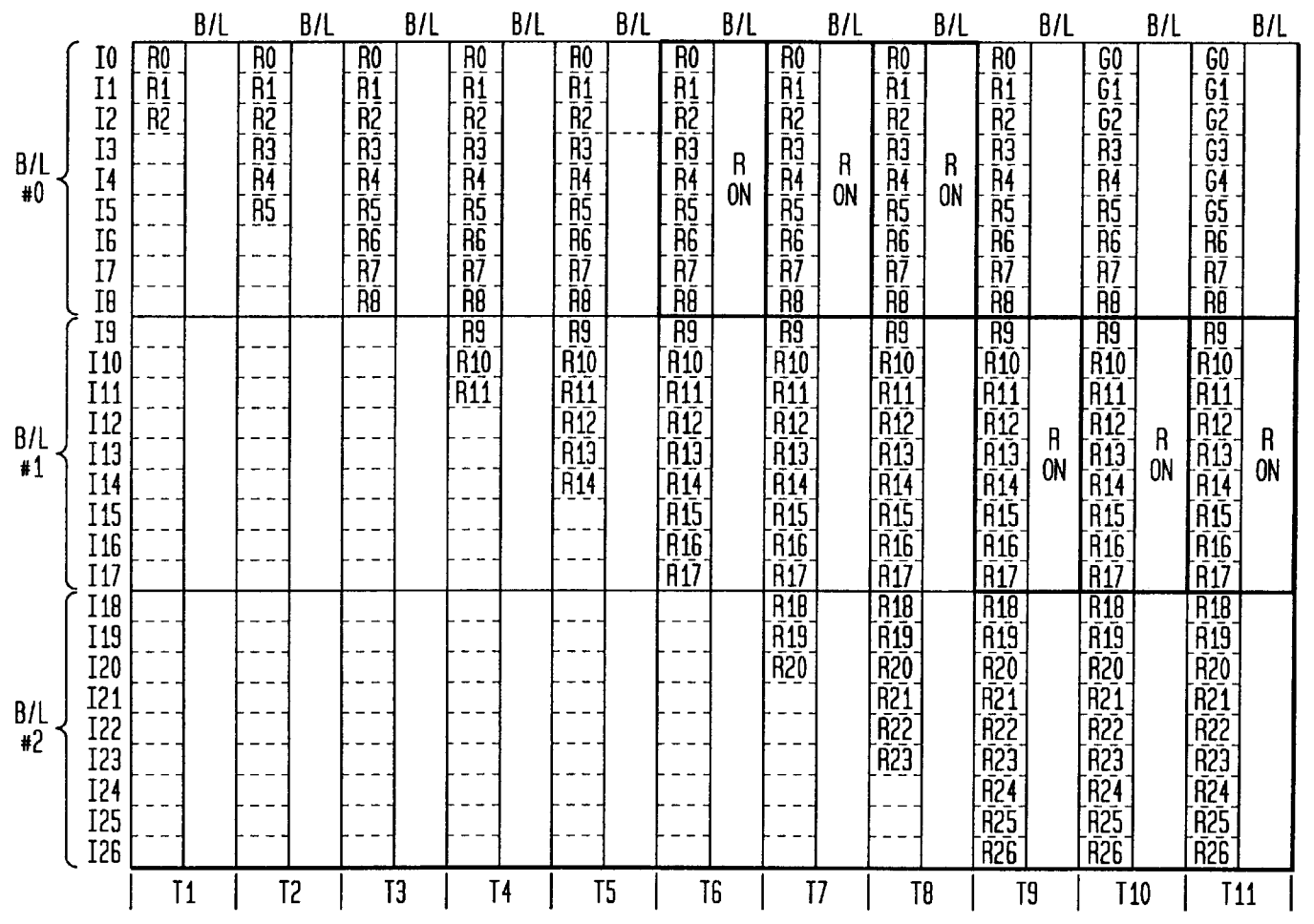
Figure 20:
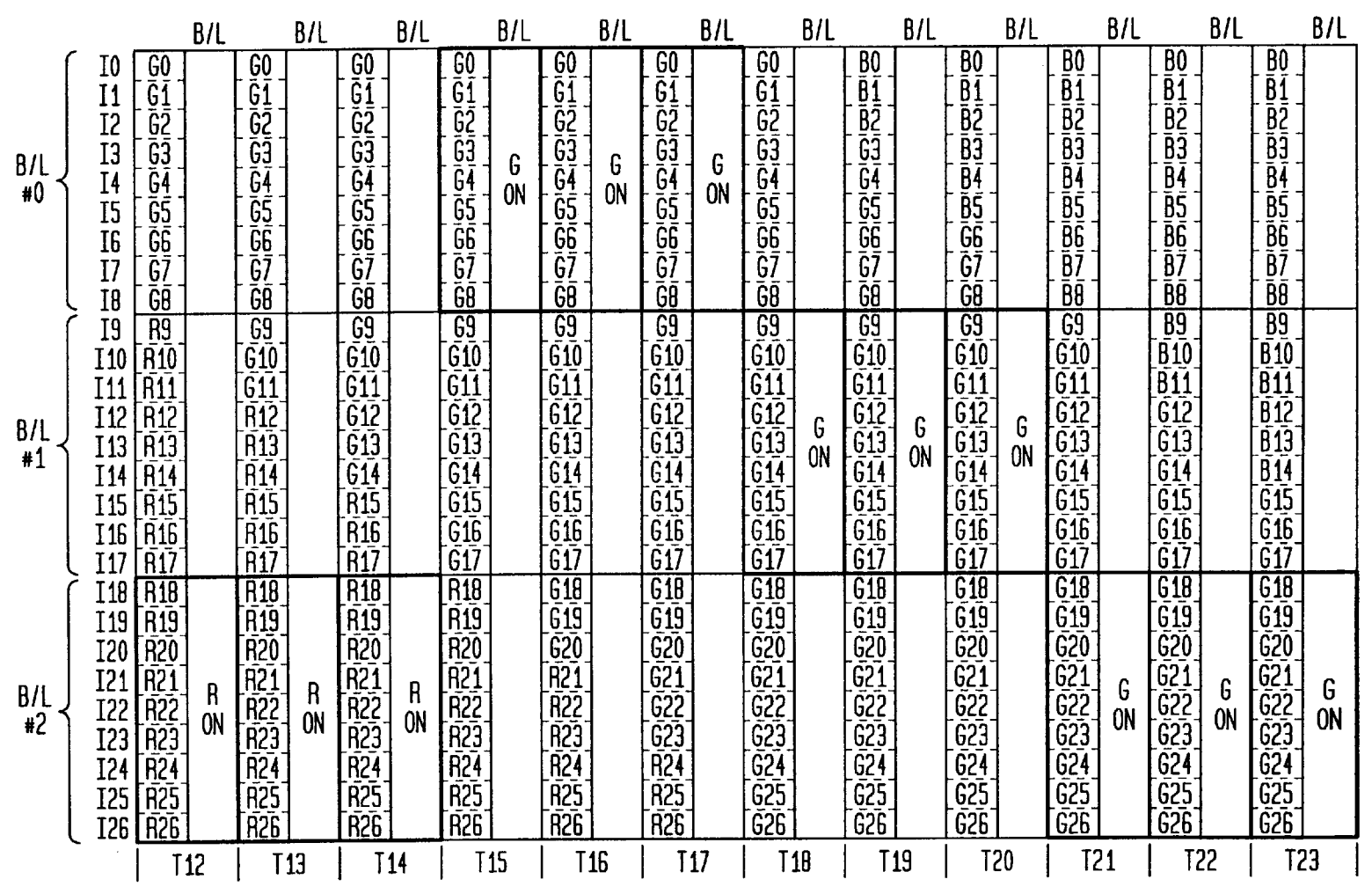
Figure 21:
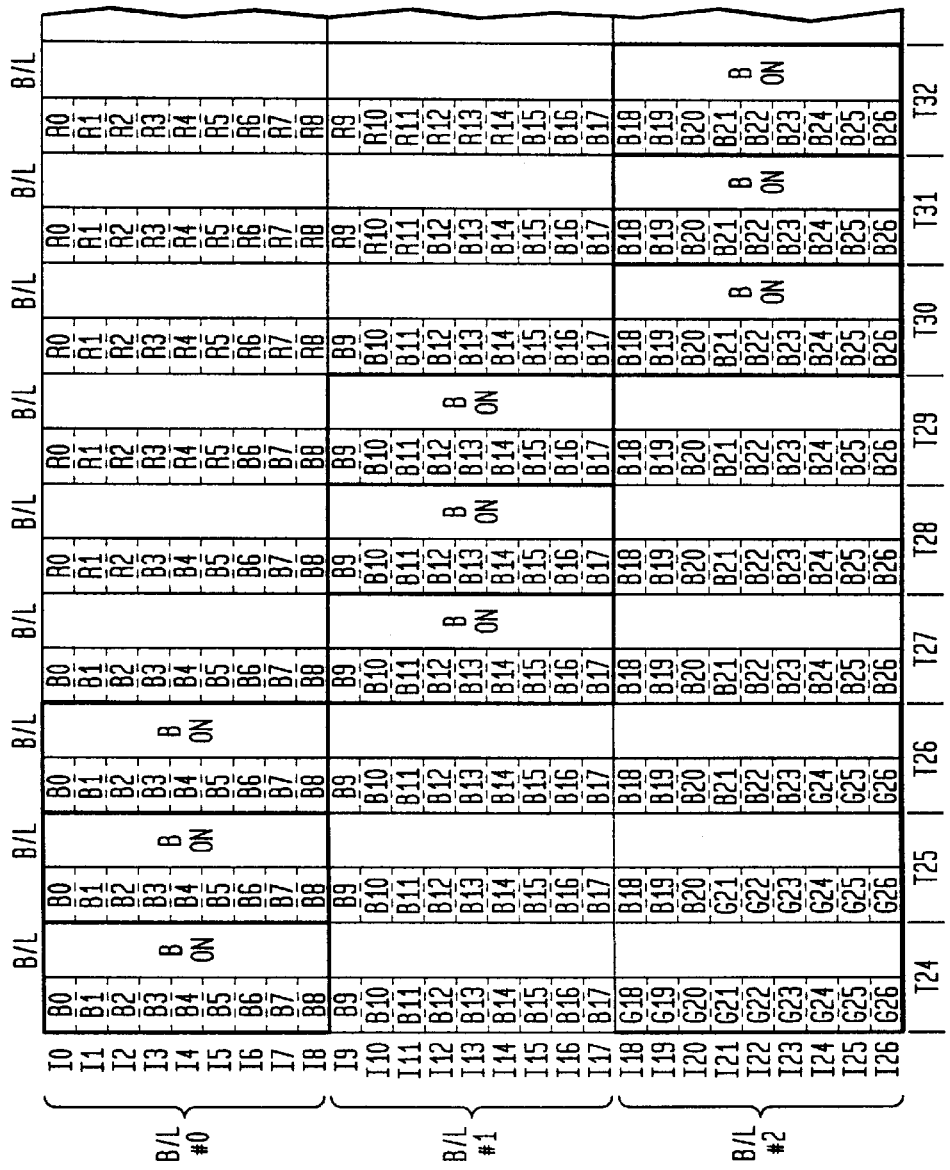
FIG. 21 is a diagram showing the processing for writing R, G and B image data in the display areas of the TFT LCD array, and the control provided for the backlight sections.

In FIGS. 19, 20 and 21 are shown the writing operation whereby R, G and B image data in the VRAM R 9, VRAM G 10 and VRAM B 11 are written to the display areas of the TFT LCD array 3 during a period extending from time T1 to time T32, and are also shown the control for the backlight sections #0 to #2. In this embodiment, the backlight section #0 is assigned for the first ⅓ area that includes pel lines I0 to I8, the backlight section #1 is assigned for the second ⅓ area that includes pel lines I9 to I17, and the backlight section #2 is assigned for the third ⅓ area that includes pel lines I18 to I26.

The LCD controller 7 and the backlight driver 8 control the backlight sections #0 to #2, so that when either R, G or B color data are written to one 1/N area, the backlight section assigned for the 1/N area is turned on to generate a light having the same color as the color data. That is, the backlight section is turned on following the elapse of the response time for the liquid crystal material in the last pel line in the corresponding 1/N area.

A period extending from time T1 to T27 represents the first frame period $1/F_f$(s), and the second frame period starts at time T28 ($F_f$ is a frame frequency). The times T1 to T32 are shown in FIGS. 19 to 21 in order to explain the operation performed with the time division method. In the initial state, all the backlight sections, #0 to #2, are turned off, and all the pixels or pels in the TFT LCD array 3 are reset, i.e., cleared.

One of the R, G, and B LEDs for one backlight section is turned on following the elapse of the response time $T_{res}$ for the liquid crystal material in the last pel line that the backlight section illuminate. In this example, the response time $T_{res}$ is equal to the sum of two periods, i.e., the sum of two write cycles. The ON operation for each backlight section is continued for a predetermined period, e.g., a time equivalent to the time allocated fro three write cycles. The R LED in the backlight section #0, for example, is turned on at time T6 following the elapse of the response time $T_{res}$ for the liquid crystal material in the pel line I8, e.g., following the elapse of the times T4 and T5. The ON state of the backlight section #0 is continued from time T6 to time T8. Then, during the response time for the liquid crystal material, and the ON period for the backlight section, the next data, e.g., R data R9 to R23, are written to the succeeding multiple pel lines.

The operation during a period extending from time T1 to time T8 is as follows:

During a period extending from time T1 to T3, data R0 to R8 are written across pel lines I0 to I8. The R LED for the backlight section #0 is turned on at time T6, following the elapse of the response time $T_{res}$ for the liquid crystal material in the pel line I8. The ON state of the R LED for the backlight section #0 is continued from time T6 to time T8, and R data R0 to R8 are displayed. During the response time $T_{res}$ i.e., a period extending from time T4 to T5, and during the ON period for the backlight section #0 is turned off before the next data G0 to G2 are written across the pel line I0 to I2 at time T10. Time T9 is used as a margin between the ON period for the backlight section #0 and the period for writing the next data G0 to G2.

The operation during a period extending from time T9 to time T11 is as follows.

It should be noted that data R9 through R23 are written in pel lines I9 through I23 during the preceding period extending from T4 to T6, i.e., the response time $T_{res}$ for the liquid crystal material in pel line I8, and during the ON period for the R LED of the backlight section #0. The R LED for the backlight section #1 is turned on at time T9, following the elapse of the response time $T_{res}$ for the liquid crystal material in the pel line I17. The ON state of the R LED for the backlight section #1 is continued from time T9 to time T11, and R data R9 to R17 are displayed. During the ON period for the backlight section #1, i.e., during a period extending from T9 to T11, the succeeding data R24 to R26 are written across the succeeding pel lines I24 to I26, and G data G0 to G5 are written across pel lines I0 to I5. It should be noted that the R LED for the backlight section #1 is turned off before the next data G9 to G11 are written across the pel lines I9 to I11 at time T13. Time T12 is used as a margin between the ON period for the backlight section #1 and the period for writing the next data G9 to G11.

The operation during a period extending from time T12 to time T14 is as follows.

It should be noted that data R18 through R26 are written in pel lines I18 through I26 during the preceding period extending from T7 to T9, i.e., the response time $T_{res}$ for the liquid crystal material in pel line I17, and during the ON period for the R LED of the backlight section #1. The R LED for the backlight section #2 is turned on at time T12, following the elapse of the response time tres for the liquid crystal material in the pel line I26 are displayed. During the ON period for the backlight section #2, the succeeding data G6 to G14 are written across the succeeding pel lines I6 to I14. It should be noted that the R LED for the backlight section #2 is turned off before the next data G18 and G20 are written across the pel lines I18 to I20 at time T16. Time T15 is used as a margin between the ON period for the backlight section #2 and the period for writing the next data G18 to G20.

The operation during a period extending from time T15 to time T17 is as follows.

It should be noted that data G0 through G8 are written across pel line I0 through I8 during the preceding period extending from T10 to T12, i.e., the response time $T_{res}$ for the liquid crystal material in pel line I26, and during the ON period for the R LED of the backlight section #2. The G LED for the backlight section #0 is turned on at time T15, following the elapse of the response time $T_{res}$ for the liquid crystal material in the pel line I8. The ON state of the G LED for the backlight section #0 is continued from time T15 to time T17, and G data G0 to G8 are displayed. During the ON period for the backlight section #0, the succeeding data G15 to G23 are written across the succeeding pel lines I15 to I23. It should be noted that the G LED for the backlight section #0 is turned off before the next data B0 to B2 are written across the pel lines I0 to I2 at time T19. Time T18 is used as a margin between the ON period for the backlight section #0 and the period for writing the next data B0 to B2.

In this manner, the G LED for the backlight section #1 is maintained on for a period extending from time T18 to T20, and the G LED for the backlight section #2 is maintained on for a period extending from time T21 to T23.

The operation during a period extending from time T24 to time T26 is as follows.

It should be noted that data B0 through B8 are written across pel lines I0 through I8 during the preceding period extending from T19 to T21. The B LED for the backlight section #0 is turned on at time T24, following the elapse of the response time $T_{res}$ for the liquid crystal material in the pel line I8. The ON state of the B LED for the backlight section #0 is continued from time T24 to time T26, and B data B0 to B8 are displayed. During the ON period for the backlight section #0, the succeeding data B15 to B23 are written across the succeeding data B15 to B23 are written across the succeeding pel lines I15 to I23. It should be noted that the B LED for the backlight section #0 is turned off before the next dat R0 to R2 are written across the pel lines I0 to I2 at time T28. Time T27 is used as a margin between the ON period for the backlight section #0 and the period for writing the next data R0 to R2.

The operation during a period extending from time T27 to time T29 is as follows.

It should be noted that data B9 through B17 are written across pel lines I9 through I17 during the preceding period extending from T22 to T24. The B LED for the backlight section #1 is turned on at time T27, following the elapse of the response time $T_{res}$ for the liquid crystal material in the pel line I17. The ON state of the B LED for the backlight section #1 is continued from time T27 to time T29, and B data B9 to B17 are displayed. During the ON period for the backlight section #1, the succeeding data B24 to B26 are written across the succeeding pel lines I24 to I26, and R data R0 to R5 are again written across pel lines I0 to I5. It should be noted that the B LED for the backlight section #1 is turned off before the next data R9 to R11 are written across the pel lines I9 to I11 at time T31. Time T30 is used as a margin between the ON period for the backlight section #1 and the period for writing the next data R9 to R11.

The operation during a period extending from time T30 to time T32 is as follows.

It should be noted that dat B18 through B26 are written across pel lines I18 through I26 during the preceding period extending from T25 to T27. The B LED for the backlight section #2 is turned on at time T30, following the elapse of the response time $T_{res}$ for the liquid crystal material in the pel line I26. The ON state of the B LED for the backlight section #2 is continued from time T30 to time T32, and B data B18 to B26 are displayed. During the ON period for the backlight section #2, the succeeding data R6 to R14 are written across the succeeding pel lines I6 to I14. It should be noted that the B LED for the backlight section #2 is turned off before the next data R18 to R20 are written across the pel lines I18 to I20 at time T34 (not shown). Time T33 (not shown) is used as a margin between the ON period for the backlight section #2 and the period for writing the next data R18 to R20.

Table 4 shows the timings for the display of R, G and B color images on the pel lines during the first from period, extending from time T1 to T27, and during the second frame period, extending from time T28 to T35.

TABLE 4

| Period | Backlight section | Color |
| --- | --- | --- |
| T6–T8 | B/L #0 | R |
| T9–T11 | B/L #1 | R |
| T–12 | B/L #2 | R |
| T15–T17 | B/L #0 | G |
| T18–T20 | B/L #1 | G |
| T21–T23 | B/L #2 | G |
| T24–T26 | B/L #0 | B |
| T27–T29 | B/L #1 | B |
| T30–T32 | B/L #2 | B |

The above operation is repeated to display color images on the TFT LCD array 3.

Figure 22:
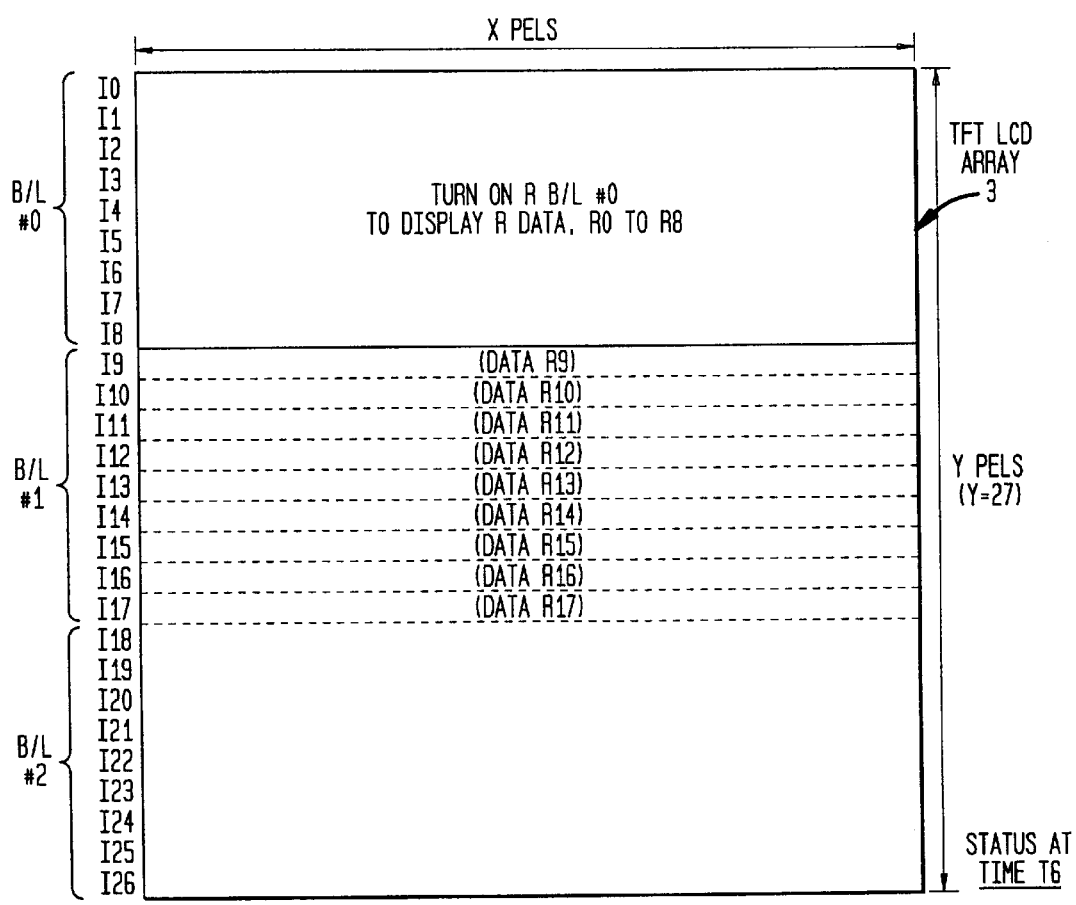
FIG. 22 is a diagram showing the status of images displayed on the TFT LCD array at time T6.
Figure 23:
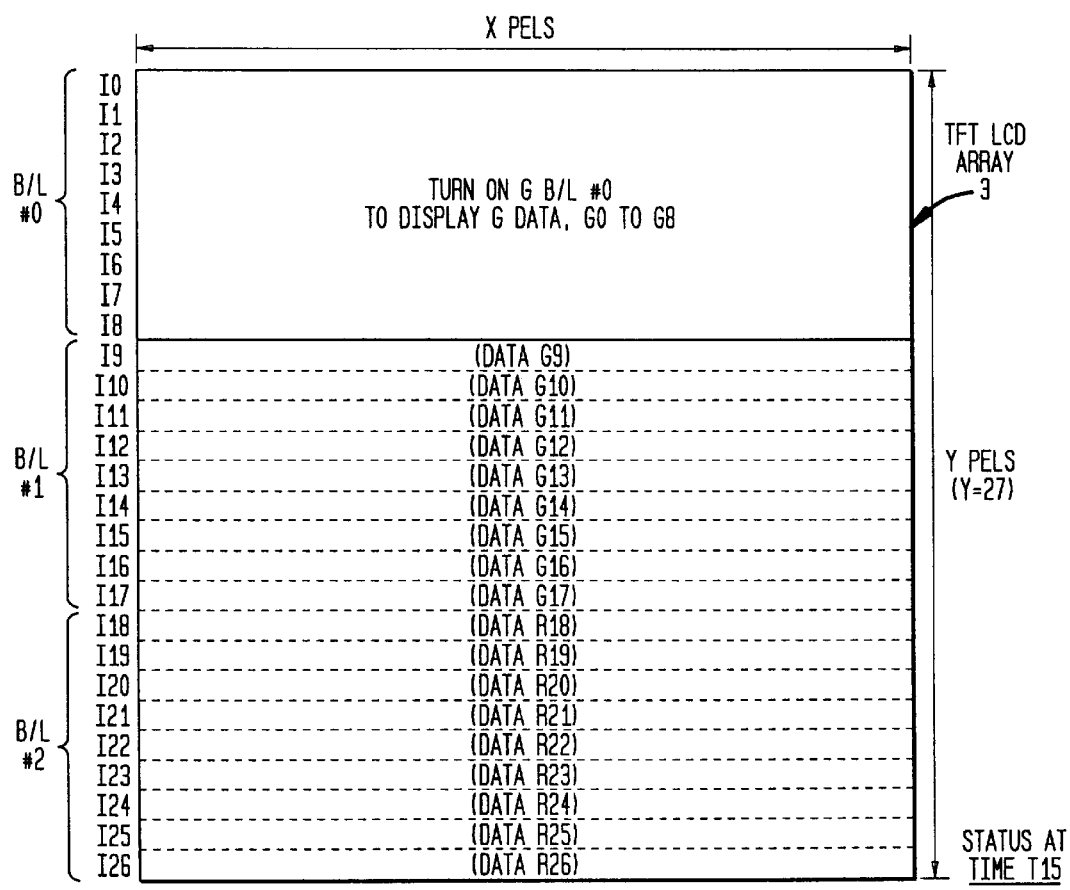
FIG. 23 is a diagram showing the status of images displayed on the TFT LCD array at time T15.

In FIGS. 22 and 23 are shown the statuses of an image displayed on the TFT LCD array at times T6 and T15. In FIG. 22, at time T6, while data R15 to R17 are being written across pel lines I15 to I17, the R LED for the backlight section #0 is turned on. Accordingly, R data on pel lines I0 to I8 are displayed, and the R data n the pel lines I9 to I17 are not displayed. In FIG. 23, at time T15, while data G15 to G17 are being written to pel lines T15 to I17, the G LED for the backlight section #0 is turned on. Accordingly, G data on pel lines I0 to I8 are displayed, and the data G9 through G17 and the dat R18 through R26 are not displayed.

Figure 24:
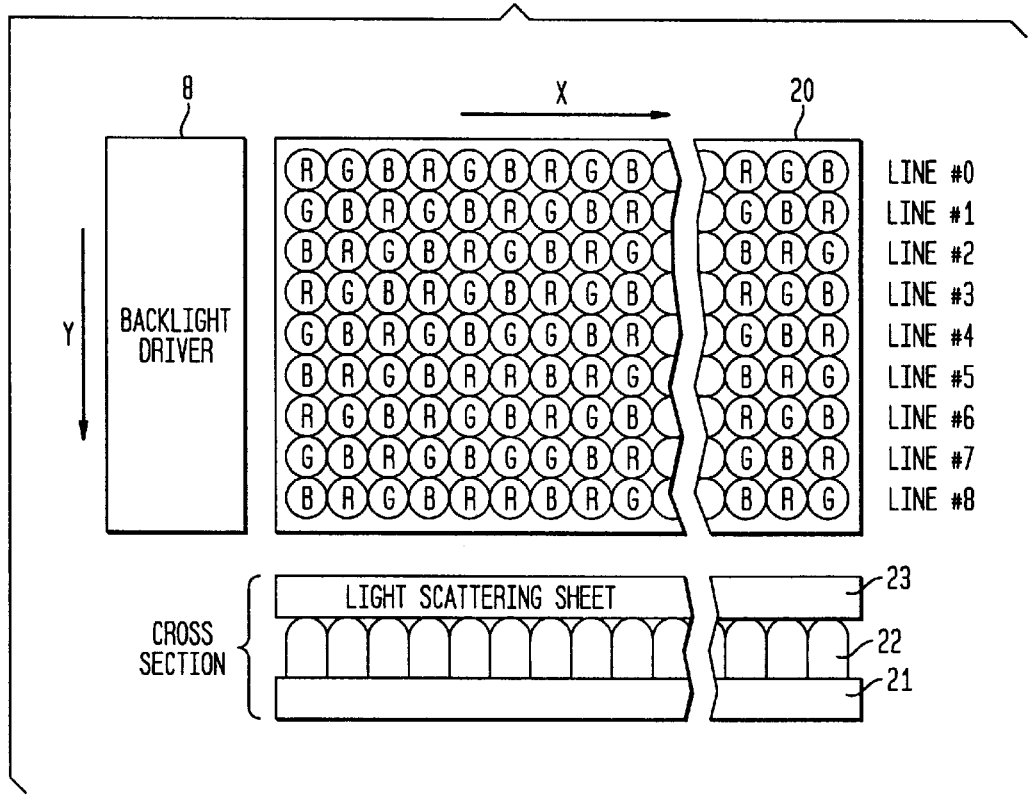
FIG. 24 is a diagram showing another example of the backlight.

In FIG. 24 is shown another example for the backlight 4. An LED array 20 is mounted on a substrate 21, and lines #0 to #8 each include R, G and B LEDs 22. The backlight driver 8 selectively activates the R, G and B LEDs. Light emitted by the R, G and B LEDs are transmitted through a light scattering sheet 23 to the TFT LCD array 3.

The present invention has been explained while referring to the first and the second embodiments for which Y=27, i.e., the TFT LCD array 3 includes 27 pel lines. It is, however, apparent that the present invention can be applied for either the SGA, the SXGA, the UXGA or the QXGA scheme shown in Table 3.

According to the present invention, an LCD device is provided that can be operated at a higher speed than can the conventional field sequential scheme.

While the invention has been particularly shown and described with respect to preferred embodiments thereof, it will be understood by those skilled in the art that the foregoing and other changes in form and details may be made therein without departing form the spirit and scope of the invention.

Having thus described our invention what we claim as new and desire to secure by Letters Patent(s):

1. A liquid crystal display device comprising:
a liquid crystal display array divided into a first area, a second area and a third area, in each of which are included a plurality of pel lines;
a first means for simultaneously performing an operation for sequentially writing first color data, selected from data provided for red, green and blue, along said plurality of pel lines in said first area, an operation for sequentially writing second color data, selected from said data provided for red, green and blue, along said plurality of pel lines in said second area, and an operation for sequentially writing third color data, selected from said data provided for red, green and blue, along said plurality of pel lines in said third area;
a backlight means, which is divided into N backlight sections, N being a multiple of 3 and is equal to or greater than 6, and which selectively generates red light, green light or blue light, wherewith N/3 backlight sections illuminate said first area, N/3 backlight sections illuminate said second area and N/3 backlight sections illuminate said third area; and
a second means for sequentially activating said N/3 backlight sections for said first area to generate first color light and sequentially displaying said first color data in said first area, for sequentially activating said N/3 backlight sections for said second area to generate second color light and sequentially displaying said second color data in said second area, and for sequentially activating said N/3 backlight sections for said third area to generate third color light and sequentially displaying said third color data in said third area, wherein the second means performs simultaneously the operation of sequentially activating said N/3 backlight sections for each color in each said first, second and third areas.

2. The liquid crystal display device according to claim 1, wherein said first means performs simultaneously said operation for writing said first color data, said operation for writing said second color data and said operation for writing said third color data.

3. The liquid crystal display device according to claim 2, wherein said first area, said second area and said third area are each divided into N/3 sub-areas, and in each of said sub-areas are included a plurality of pel lines.

4. The liquid crystal display device according to claim 3, wherein, when one color data set is written in one of said sub-areas, said second means activates a backlight section assigned for said sub-area, and before another color data set is written in said sub-area, said second means deactivates said backlight section.

5. The liquid crystal display device according to claim 2, wherein the same number of pel lines are included in said first area, said second area and said third area.

6. The liquid crystal display device according to claim 3, wherein, when one part of one color data set is displayed in one of said sub-areas, the following part of said color data is written in the succeeding sub-area.

7. The liquid crystal display device according to claim 3, wherein, when one part of one color data set is displayed in one of said sub-area, the following part of said color data is written across said pel lines in the succeeding multiple sub-areas.

8. The liquid crystal display device according to claim 3, wherein a backlight section assigned for one of said sub-areas is turned on following the expiration of a response time for a liquid crystal material in the last pel line in said sub-area.

9. The liquid crystal display device according to claim 3, wherein said first means writes said first color data, said second color data and said third color data at predetermined intervals in one of said sub-areas, and a backlight section assigned for said sub-area generates light for said first color when said first color data have been written, generates light for said second color when said second color data have been written, and generates light for said third color when said third color data have been written.

10. The liquid crystal display device according to claim 3, wherein said second means controls said N backlight sections so as to sequentially display said color data written in said sub-areas during a period $1/F_f$ ($F_f$ is a frame frequency).

11. A liquid crystal display device comprising:
a liquid crystal display array, which includes horizontally arranged X pels and vertically arranged Y pels, which is divided into a first area, a second area and a third area, in each of which are included horizontally extended Y/3 pel lines, and which is divided into N/3 sub-areas, N being a multiple of 3 and is equal to or greater than 6;
a first means for simultaneously performing an operation for sequentially writing first color data, selected from data provided for red, green and blue, across Y pel lines beginning with the first pel line in said first area, continuing through said pel lines in said second area and ending with the last pel line in said third area, for performing an operation for sequentially writing second color data, selected from said data provided for red, green and blue, across Y pel lines beginning with the first pel line in said second area, continuing through said pel lines in said third area and ending with the last pel line in said first area, and for performing an operation for sequentially writing third color data selected from said red, green and blue data into Y pel lines beginning with the first pel line in said third area, continuing through said pel lines in said first area and ending with the last pel line in said second area;

a backlight means, which is divided into N backlight sections and which selectively generates red light, green light or blue light, wherewith N/3 backlight sections illuminate said first area, N/3 backlight sections illuminate said second area and N/3 backlight sections illuminate said third area; and a second means for controlling said N backlight sections, so that when one color data set, selected from said data provided for red, green and blue, have been written to one of said sub-areas, a backlight section assigned for said sub-area is turned on to generate a light having the same color as said color data set, wherein said second means performs simultaneously said operation for sequentially activating said N/3 backlight sections for each color in each said first, second and third areas.

12. The liquid crystal display device according to claim 11, wherein, when one color data set is written in one of said sub-areas, said second means activates a backlight section assigned for said sub-area, and before another color data set is written in said sub-area, said second means deactivates said backlight section.

13. The liquid crystal display device according to claim 11, wherein, when one part of one color data set is displayed in one of said sub-areas, the following part of said color data is written in the succeeding sub-area.

14. The liquid crystal display device according to claim 11, wherein, when one part of one color data set is displayed in one of said sub-areas, the following part of said color data is written across said pel lines in the succeeding multiple sub-area.

15. The liquid crystal display device according to claim 11, wherein a backlight section assigned for one of said sub-areas is turned on following the expiration of a response time for a liquid crystal material in the last pel line in said sub-area.

16. The liquid crystal display device according to claim 11, wherein said first means writes said first color data, said second color data and said third color data at predetermined intervals in one of said sub-areas, and a backlight section assigned for said sub-area generates light for said first color when said first color data have been written generates light for said second color when said second color data have been written, and generates light for said third color when said third color data have been written.

17. The liquid crystal display device according to claim 11, wherein said second means controls said N backlight sections so as to sequentially display said color data written in said sub-areas during a period $1/F_f$ ($F_f$ is a frame frequency).

18. A liquid crystal display device comprising:

a liquid crystal display array, each of which includes plurality of pel lines that are sorted into a plurality of pel line groups, each of which includes at least two continuous pel lines;

a first means for sequentially writing to said plurality of pel line groups first color data selected from data provided for red, green and blue, for sequentially writing to said plurality of pel line groups second color data selected from said data provided for red, green and blue, and for sequentially writing to said plurality of pel line groups third color data selected from said data provided for red, green and blue, each of said pel lines in a pel lines group being driven simultaneously during each sequence;

a backlight means, which is divided into N backlight sections (N is an integer equal to or greater than 2) and which selectively generates red light, green light or blue light, whereof each of said N backlight sections is assigned for a 1/N area in said liquid crystal display array; and a second means for sequentially activating said N backlight sections in order to sequentially display said color data written across said plurality of pel line groups in said liquid crystal display array.

19. The liquid crystal display device according to claim 18, wherein, when one color data set has been written across pel lines in said 1/N area, said second means activates a backlight section assigned for said 1/N area to generate a light having the same color as said color data set, and then, before another color data set is written to said 1/N area, said second means deactivates said backlight section.

20. The liquid crystal display device according to claim 18, wherein, when one part of one color data set is displayed in one 1/N area, the following part of said color data is written in the succeeding 1/N area.

21. The liquid crystal display device according to claim 18, wherein, when one part of one color data set is displayed in one 1/N area, the following part of said color data is written across said pel lines in the succeeding multiple 1/N areas.

22. The liquid crystal display device according to claim 18, wherein a backlight section assigned for one 1/N area is turned on following the expiration of response time for a liquid crystal material in the last pel line in said 1/N area.

* * * * *